(12) United States Patent
Ibrahim et al.

(10) Patent No.: US 8,116,401 B2
(45) Date of Patent: Feb. 14, 2012

(54) METHOD AND SYSTEM FOR DIGITAL SPUR CANCELLATION

(75) Inventors: Brima Ibrahim, Aliso Viejo, CA (US);
Hea Joung Kim, Irvine, CA (US);
Bojko Marholey, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1405 days.

(21) Appl. No.: 11/286,947

(22) Filed: Nov. 22, 2005

(65) Prior Publication Data

US 2006/0269004 A1    Nov. 30, 2006

Related U.S. Application Data

(60) Provisional application No. 60/685,239, filed on May 26, 2005.

(51) Int. Cl.
*H04L 27/10* (2006.01)
(52) U.S. Cl. ............ 375/278; 330/149; 324/76.52; 324/624; 398/211
(58) Field of Classification Search .......... 324/76.58; 330/149; 375/278; 708/276, 300; 455/333
See application file for complete search history.

(56) References Cited

U.S. PATENT DOCUMENTS

| | | | |
|---|---|---|---|
| 5,654,909 A * | 8/1997 | Sun | 708/300 |
| 5,737,253 A * | 4/1998 | Madisetti et al. | 708/276 |
| 6,172,564 B1 * | 1/2001 | Rzyski | 330/149 |
| 6,525,522 B1 * | 2/2003 | Pickerd | 324/76.58 |
| 7,272,375 B2 * | 9/2007 | Tuttle et al. | 455/333 |

* cited by examiner

*Primary Examiner* — David C. Payne
*Assistant Examiner* — Adolf Dsouza
(74) *Attorney, Agent, or Firm* — Thomas, Kayden, Horstemeyer & Risley, LLP

(57) ABSTRACT

A method and system for digital spur cancellation may include removing a spur in a left channel minus right channel (L−R) baseband signal generated from a FM signal. The L−R baseband signal may be generated by demodulating a sub-carrier, for example, by using CORDIC algorithm, in a signal demodulated from the FM signal. An orthogonal signal may also be generated by demodulating a sub-carrier, for example, by using CORDIC algorithm, in a signal demodulated from the FM signal. The phase of the orthogonal signal may be further adjusted to introduce a substantially −90° phase shift to spurs at a specific frequency. Accordingly, the spurs in the L−R baseband signal may be cancelled when the first L−R baseband signal is combined with the phase adjusted orthogonal signal.

24 Claims, 23 Drawing Sheets

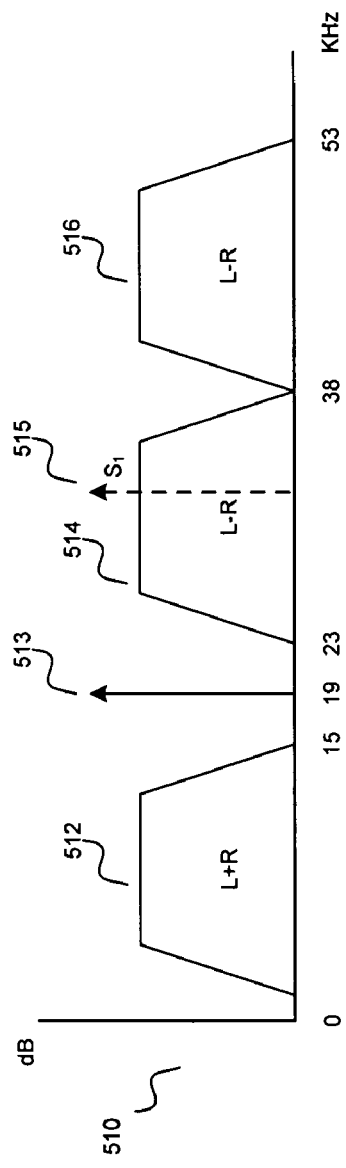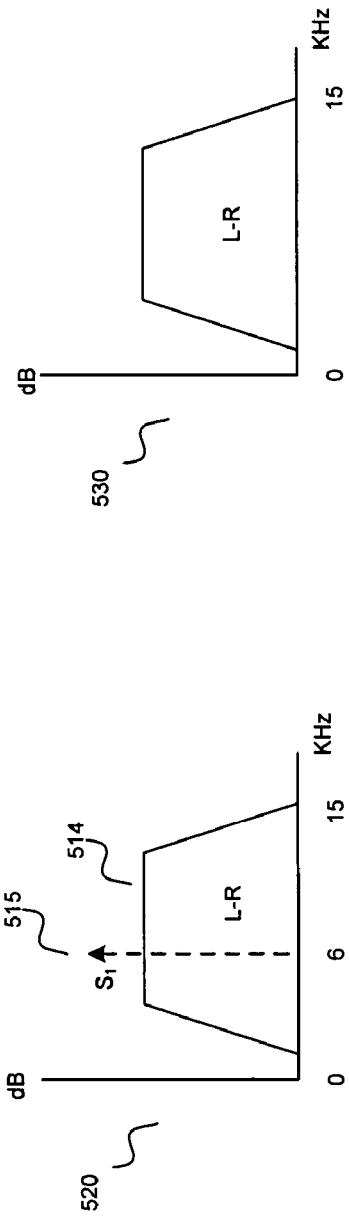
FIG. 5A
FIG. 5B
FIG. 5C

METHOD AND SYSTEM FOR DIGITAL SPUR CANCELLATION

CROSS-REFERENCE TO RELATED APPLICATIONS/INCORPORATION BY REFERENCE

The application makes reference to, claims priority to, and claims the benefit of U.S. Provisional Application Ser. No. 60/685,239 filed on May 26, 2005.

This application also makes reference to:
U.S. application Ser. No. 11/286,555 filed on Nov. 22, 2005;
U.S. application Ser. No. 11/287,120 filed on Nov. 22, 2005;
U.S. application Ser. No. 11/286,950 filed on Nov. 22, 2005;
U.S. application Ser. No. 11/287,075 filed on Nov. 22, 2005;
U.S. application Ser. No. 11/287,181 filed on Nov. 22, 2005;
U.S. application Ser. No. 11/287,034 filed on Nov. 22, 2005;
U.S. application Ser. No. 11/287,044 filed on Nov. 22, 2005;
U.S. application Ser. No. 11/286,844 filed on Nov. 22, 2005; and
U.S. application Ser. No. 11/176,417 filed on Jul. 7, 2005.

Each of the above stated applications is hereby incorporated herein by reference in its entirety.

FIELD OF THE INVENTION

Certain embodiments of the invention relate to Bluetooth and FM communication technologies. More specifically, certain embodiments of the invention relate to a method and system for digital spur cancellation.

BACKGROUND OF THE INVENTION

With the popularity of portable electronic devices and wireless devices that support audio applications, there is a growing need to provide a simple and complete solution for audio communications applications. For example, some users may utilize Bluetooth-enabled devices, such as headphones and/or speakers, to allow them to communicate audio data with their wireless handset while freeing to perform other activities. Other users may have portable electronic devices that may enable them to play stored audio content and/or receive audio content via broadcast communication, for example.

However, integrating multiple audio communication technologies into a single device may be costly. Combining a plurality of different communication services into a portable electronic device or a wireless device may require separate processing hardware and/or separate processing software. Moreover, coordinating the reception and/or transmission of data to and/or from the portable electronic device or a wireless device may require significant processing overhead that may impose certain operation restrictions and/or design challenges. For example, a handheld device such as a cellphone that incorporates Bluetooth and Wireless LAN may pose certain coexistence problems caused by the close proximity of the Bluetooth and WLAN transceivers.

Furthermore, simultaneous use of a plurality of radios in a handheld may result in significant increases in power consumption. Since power is a precious commodity in most wireless mobile devices, combining devices such as a cellular radio, a Bluetooth radio and a WLAN radio requires careful design and implementation in order to minimize power usage.

Generally, having fewer parts in a device will translate to smaller power requirements and this is very important for handheld communication devices that are battery powered. Accordingly, more and more of baseband processing may be done digitally to reduce a number of power-hungry analog parts.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for digital spur cancellation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 5A is a graph of received FM MPX signals, in accordance with an embodiment of the invention.

FIG. 5B is a graph of the L–R signal with spur noise, in accordance with an embodiment of the invention.

FIG. 5C is a graph of the L–R signal without spur noise, in accordance with an embodiment of the invention.

DETAILED DESCRIPTION OF THE INVENTION

Certain embodiments of the invention may be found in a method and system for digital spur cancellation. Aspects of the method may comprise removing a spur in a first left channel minus right channel (L–R) baseband signal generated from an FM signal. The first L–R baseband signal may be generated by demodulating a sub-carrier in a signal demodulated from the FM signal. A CORDIC algorithm, for example, may be used to demodulate the sub-carrier. The CORDIC algorithm may also generate an orthogonal signal where the phase of the orthogonal signal may be substantially −90° out of phase with respect to an in-phase signal. The phase of the orthogonal signal may be further adjusted to introduce a substantially −90° phase shift to the spur, which may be at a specific frequency. A shift register that may utilize a clock at an appropriate frequency may introduce the phase shift to the spur. Alternatively, Hilbert transform may be used to phase shift the spur. Accordingly, the spur in the first L–R baseband signal may be cancelled when the first L–R baseband signal is combined with the phase adjusted orthogonal signal. The second L–R baseband signal may be combined with the combined baseband signal to increase the signal to noise ratio.

Figure 1A:
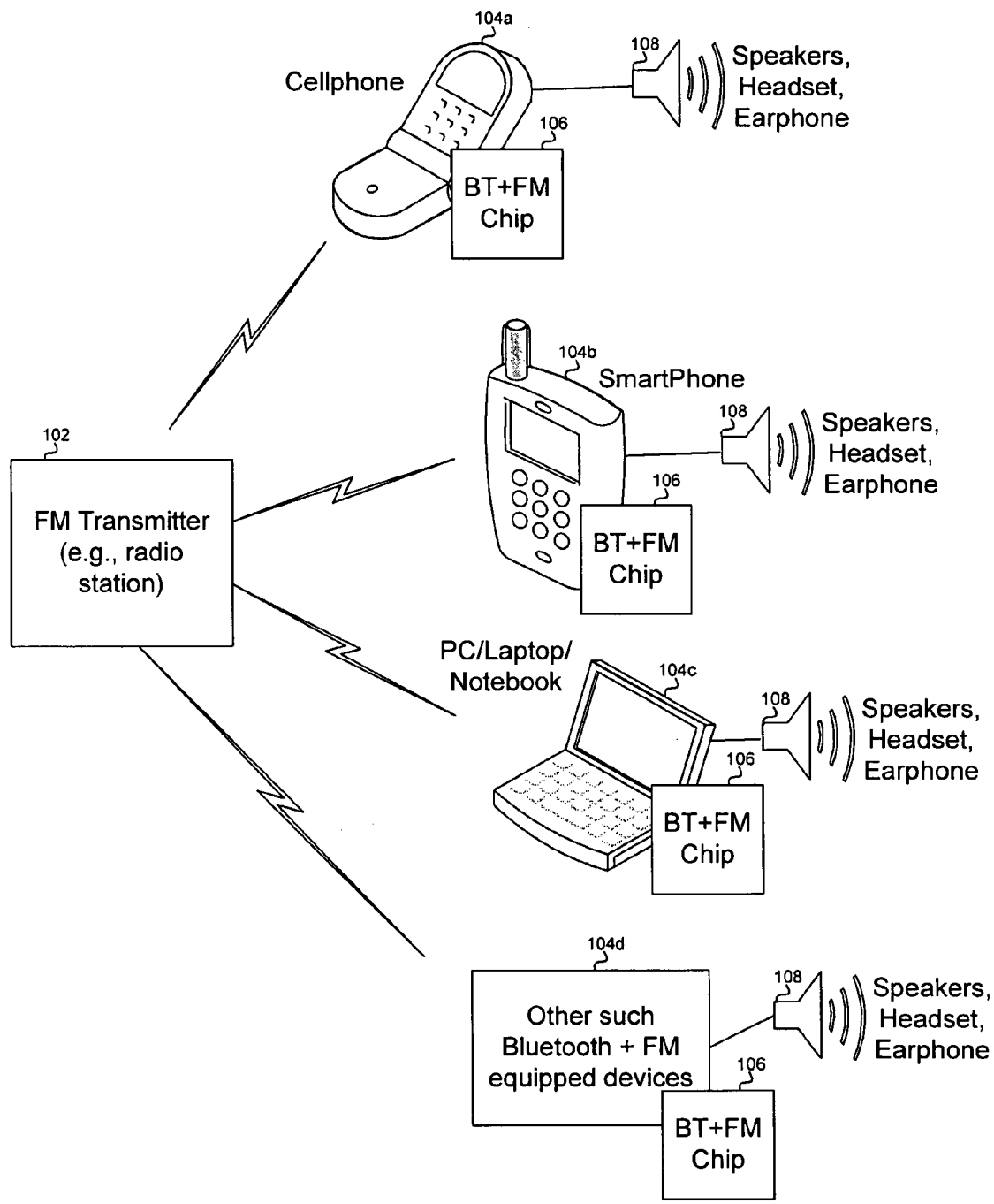
FIG. 1A is a block diagram of an exemplary FM transmitter that communicates with handheld devices that utilize a single chip with integrated Bluetooth and FM radios, in accordance with an embodiment of the invention.

FIG. 1A is a block diagram of an exemplary FM transmitter that communicates with handheld devices that utilize a single chip with integrated Bluetooth and FM radios, in accordance with an embodiment of the invention. Referring to FIG. 1A, there is shown an FM transmitter 102, a cellular phone 104a, a smart phone 104b, a computer 104c, and an exemplary FM and Bluetooth-equipped device 104d. The FM transmitter 102 may be implemented as part of a radio station or other broadcasting device, for example. Each of the cellular phone 104a, the smart phone 104b, the computer 104c, and the exemplary FM and Bluetooth-equipped device 104d may comprise a single chip 106 with integrated Bluetooth and FM radios for supporting FM and Bluetooth data communications. The FM transmitter 102 may enable communication of FM audio data to the devices shown in FIG. 1A by utilizing the single chip 106. Each of the devices in FIG. 1A may comprise and/or may be communicatively coupled to a listening device 108 such as a speaker, a headset, or an earphone, for example.

The cellular phone 104a may be enabled to receive an FM transmission signal from the FM transmitter 102. The user of the cellular phone 104a may then listen to the transmission via the listening device 108. The cellular phone 104a may comprise a "one-touch" programming feature that enables pulling up specifically desired broadcasts, like weather, sports, stock quotes, or news, for example. The smart phone 104b may be enabled to receive an FM transmission signal from the FM transmitter 102. The user of the smart phone 104b may then listen to the transmission via the listening device 108.

The computer 104c may be a desktop, laptop, notebook, tablet, and a PDA, for example. The computer 104c may be enabled to receive an FM transmission signal from the FM transmitter 102. The user of the computer 104c may then listen to the transmission via the listening device 108. The computer 104c may comprise software menus that configure listening options and enable quick access to favorite options, for example. In one embodiment of the invention, the computer 104c may utilize an atomic clock FM signal for precise timing applications, such as scientific applications, for example. While a cellular phone, a smart phone, computing devices, and other devices have been shown in FIG. 1A, the single chip 106 may be utilized in a plurality of other devices and/or systems that receive and use Bluetooth and/or FM signals. In one embodiment of the invention, the single chip Bluetooth and FM radio may be utilized in a system comprising a WLAN radio. The U.S. application Ser. No. 11/286,844, filed on Nov. 22, 2005, discloses a method and system comprising a single chip Bluetooth and FM radio integrated with a wireless LAN radio, and is hereby incorporated herein by reference in its entirety.

Figure 1B:
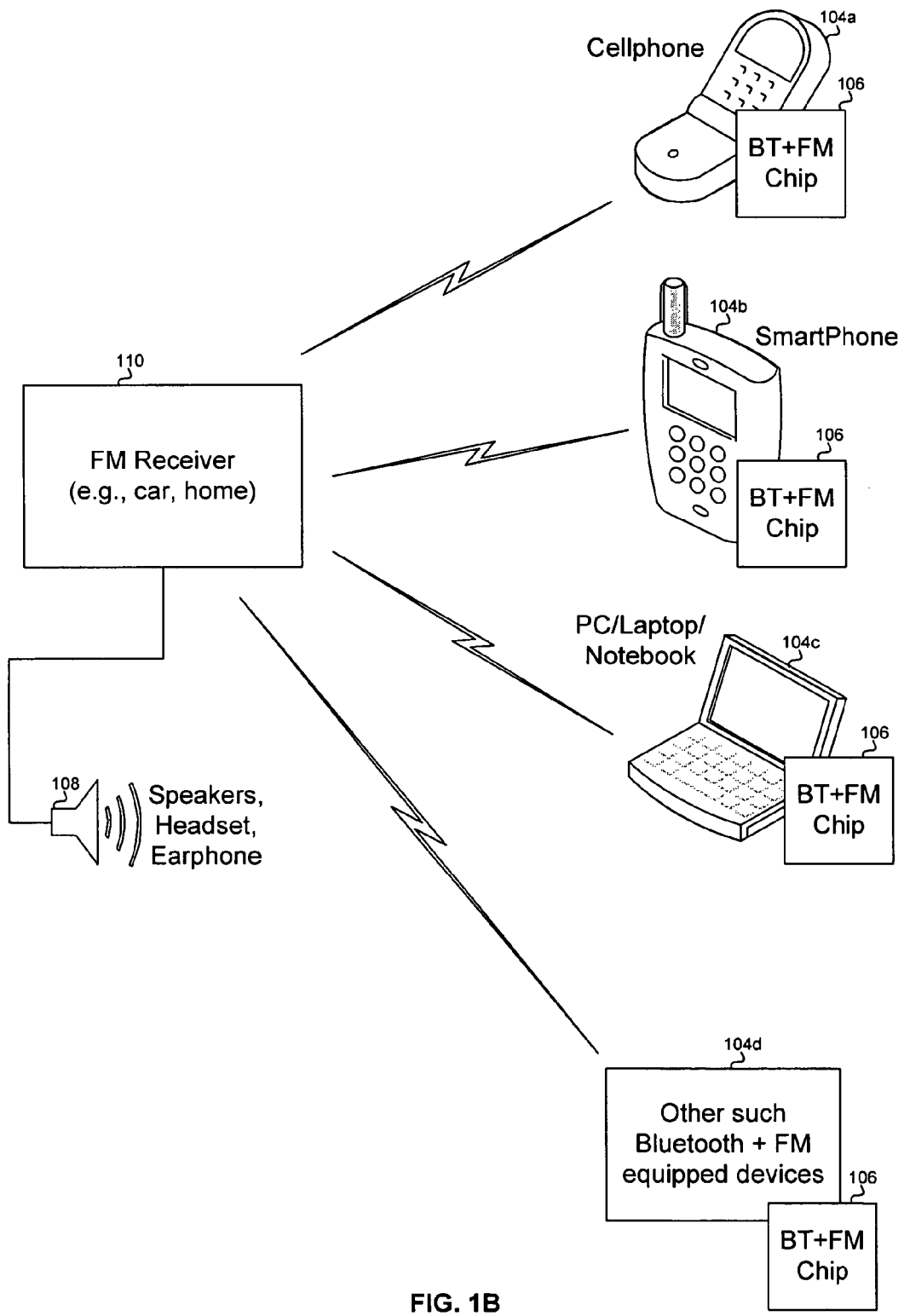
FIG. 1B is a block diagram of an exemplary FM receiver that communicates with handheld devices that utilize a single chip with integrated Bluetooth and FM radios, in accordance with an embodiment of the invention.

FIG. 1B is a block diagram of an exemplary FM receiver that communicates with handheld devices that utilize a single chip with integrated Bluetooth and FM radios, in accordance with an embodiment of the invention. Referring to FIG. 1B, there is shown an FM receiver 110, the cellular phone 104a, the smart phone 104b, the computer 104c, and the exemplary FM and Bluetooth-equipped device 104d. In this regard, the FM receiver 110 may comprise and/or may be communicatively coupled to a listening device 108. A device equipped with the Bluetooth and FM transceivers, such as the single chip 106, may be able to broadcast its respective signal to a "deadband" of an FM receiver for use by the associated audio system. For example, a cellphone or a smart phone, such as the cellular phone 104a and the smart phone 104b, may transmit a telephone call for listening over the audio system of an automobile, via usage of a deadband area of the car's FM stereo system. One advantage may be the universal ability to use this feature with all automobiles equipped simply with an FM radio with few, if any, other external FM transmission devices or connections being required.

In another example, a computer, such as the computer 104c, may comprise an MP3 player or another digital music format player and may broadcast a signal to the deadband of an FM receiver in a home stereo system. The music on the computer may then be listened to on a standard FM receiver with few, if any, other external FM transmission devices or connections. While a cellular phone, a smart phone, and computing devices have been shown, a single chip that combines a Bluetooth and FM transceiver and/or receiver may be utilized in a plurality of other devices and/or systems that receive and use an FM signal.

The FM transmitting devices may transmit stereo music in the FM radio band of 88-108 MHz using the same modulation that FM radio stations use to transmit stereo signals. This is an FM multiplex (MPX) transmission standard. The FM transmission may transmit a left channel plus a right channel (L+R) signal and a left channel minus a right channel (L−R) signal. Accordingly, the L+R signal may be added to the L−R signal, and the result may be a signal 2L. This signal may have twice the signal strength of the left channel in either the L+R or L−R channels. Additionally, the L−R signal may be subtracted from the L+R signal, and the result may be a signal 2R. This signal may have twice the signal strength of the right channel in either the L+R or L−R channels. The FM MPX standard may be described in more detail with respect to FIG. 5A.

Figure 1C:
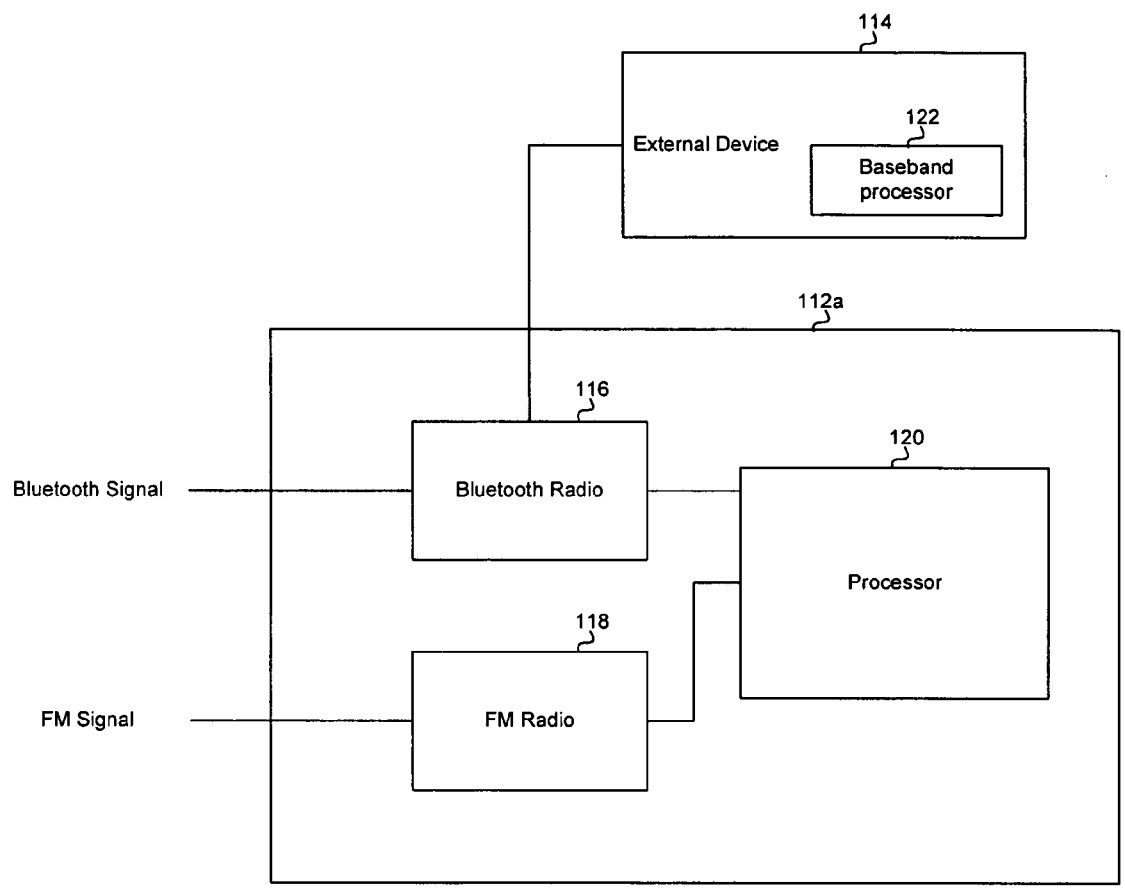
FIG. 1C is a block diagram of an exemplary single chip with integrated Bluetooth and FM radios that supports FM processing and an external device that supports Bluetooth processing, in accordance with an embodiment of the invention.

FIG. 1C is a block diagram of an exemplary single chip with integrated Bluetooth and FM radios that supports FM processing and an external device that supports Bluetooth processing, in accordance with an embodiment of the invention. Referring to FIG. 1C, there is shown a single chip 112a that supports Bluetooth and FM radio operations and an external device 114. The single chip 112a may comprise an integrated Bluetooth radio 116, an integrated FM radio 118, and an integrated processor 120. The Bluetooth radio 116 may comprise suitable logic, circuitry, and/or code that enable Bluetooth signal communication via the single chip 112a. In this regard, the Bluetooth radio 116 may support audio signals or communication. The FM radio 118 may comprise suitable logic, circuitry, and/or code that enable FM signal communication via the single chip 112a.

The integrated processor 120 may comprise suitable logic, circuitry, and/or code that may enable processing of the FM data received by the FM radio 118. Moreover, the integrated processor 120 may enable processing of FM data to be transmitted by the FM radio 118 when the FM radio 118 comprises transmission capabilities. The external device 114 may comprise a baseband processor 122. The baseband processor 122 may comprise suitable logic, circuitry, and/or code that may enable processing of Bluetooth data received by the Bluetooth radio 116. Moreover, the baseband processor 122 may enable processing of Bluetooth data to be transmitted by the Bluetooth radio 116. In this regard, the Bluetooth radio 116 may communicate with the baseband processor 122 via the external device 114. The Bluetooth radio 116 may communicate with the integrated processor 120.

Figure 1D:
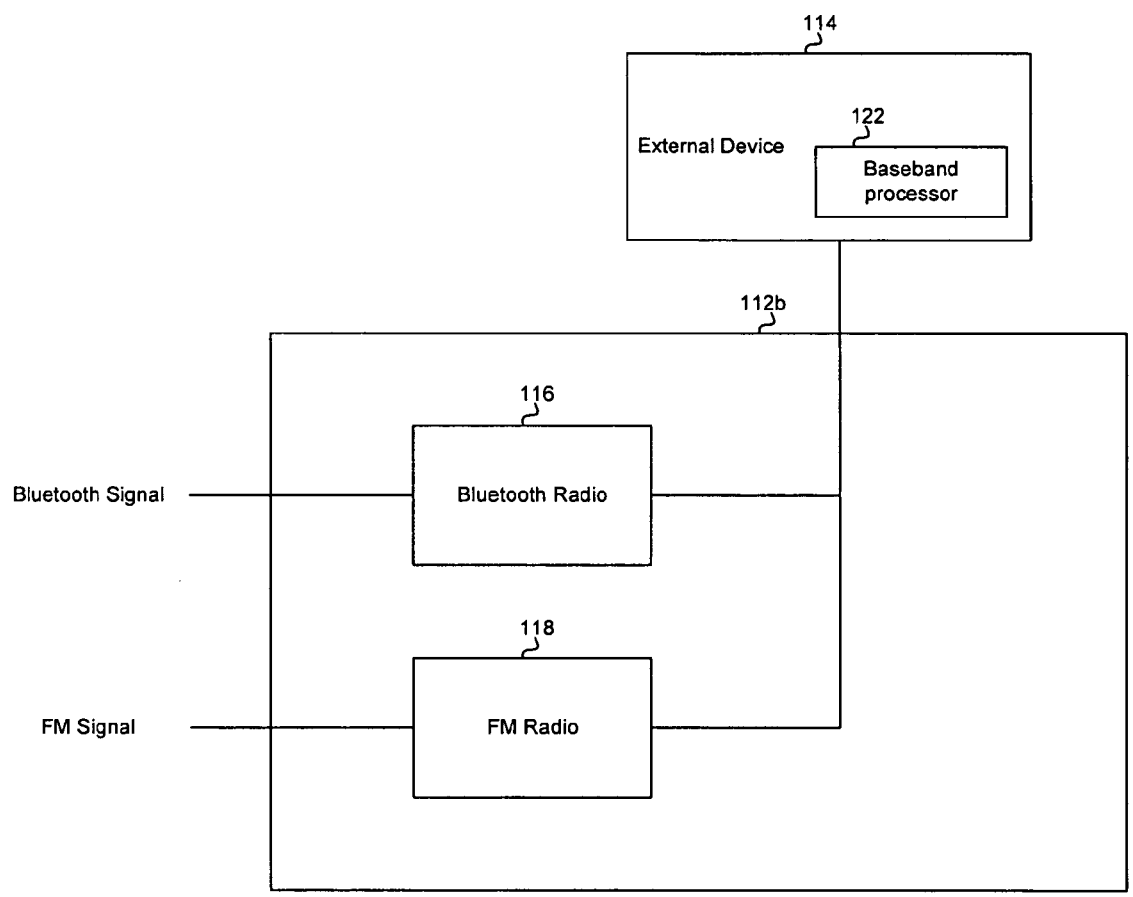
FIG. 1D is a block diagram of an exemplary single chip with integrated Bluetooth and FM radios and an external device that supports Bluetooth and FM processing, in accordance with an embodiment of the invention.

FIG. 1D is a block diagram of an exemplary single chip with integrated Bluetooth and FM radios and an external device that supports Bluetooth and FM processing, in accordance with an embodiment of the invention. Referring to FIG. 1D, there is shown a single chip 112b that supports Bluetooth and FM radio operations and an external device 114. The single chip 112b may comprise the Bluetooth radio 116 and the FM radio 118. The Bluetooth radio 116 and/or the FM radio 118 may be integrated into the single chip 112b. The external device 114 may comprise a baseband processor 122. The baseband processor 122 may comprise suitable logic, circuitry, and/or code that may enable processing of Bluetooth data received by the Bluetooth radio 116 and/or processing of Bluetooth data to be transmitted by the Bluetooth radio 116. In this regard, the Bluetooth radio 116 may communicate with the baseband processor 122 via the external device 114. Moreover, the baseband processor 122 may comprise suitable logic, circuitry, and/or code that may enable processing of the FM data received by the FM radio 118. The baseband processor 122 may enable processing FM data to be transmitted by the FM radio 118 when the FM radio 118 comprises transmission capabilities. In this regard, the FM radio 118 may communicate with the baseband processor 122 via the external device 114.

Figure 1E:
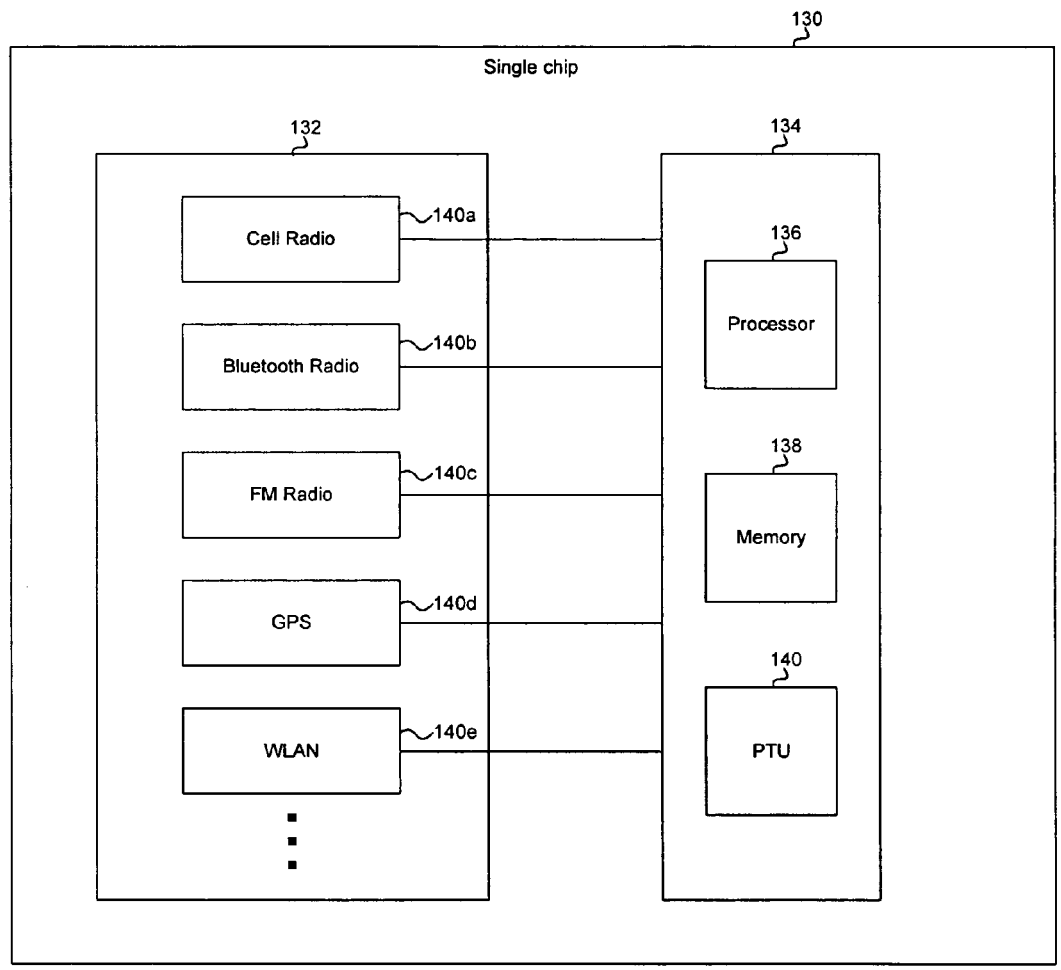
FIG. 1E is a block diagram of an exemplary single chip with multiple integrated radios that supports radio data processing, in accordance with an embodiment of the invention.

FIG. 1E is a block diagram of an exemplary single chip with multiple integrated radios that supports radio data processing, in accordance with an embodiment of the invention. Referring to FIG. 1E, there is shown a single chip 130 that may comprise a radio portion 132 and a processing portion 134. The radio portion 132 may comprise a plurality of integrated radios. For example, the radio portion 132 may comprise a cell radio 140a that supports cellular communications, a Bluetooth radio 140b that supports Bluetooth communications, an FM radio 140c that supports FM communications, a global positioning system (GPS) 140d that supports GPS communications, and/or a wireless local area network (WLAN) 140e that supports communications based on the IEEE 802.11 standards.

The processing portion 134 may comprise at least one processor 136, a memory 138, and a peripheral transport unit (PTU) 140. The processor 136 may comprise suitable logic, circuitry, and/or code that enable processing of data received from the radio portion 132. In this regard, each of the integrated radios may communicate with the processing portion 134. In some instances, the integrated radios may communicate with the processing portion 134 via a common bus, for example. The memory 138 may comprise suitable logic, circuitry, and/or code that enable storage of data that may be utilized by the processor 136. In this regard, the memory 138 may store at least a portion of the data received by at least one of the integrated radios in the radio portion 132. Moreover, the memory 138 may store at least a portion of the data that may be transmitted by at least one of the integrated radios in the radio portion 132. The PTU 140 may comprise suitable logic, circuitry, and/or code that may enable interfacing data in the single chip 130 with other devices that may be communicatively coupled to the single chip 130. In this regard, the PTU 140 may support analog and/or digital interfaces.

Figure 1F:
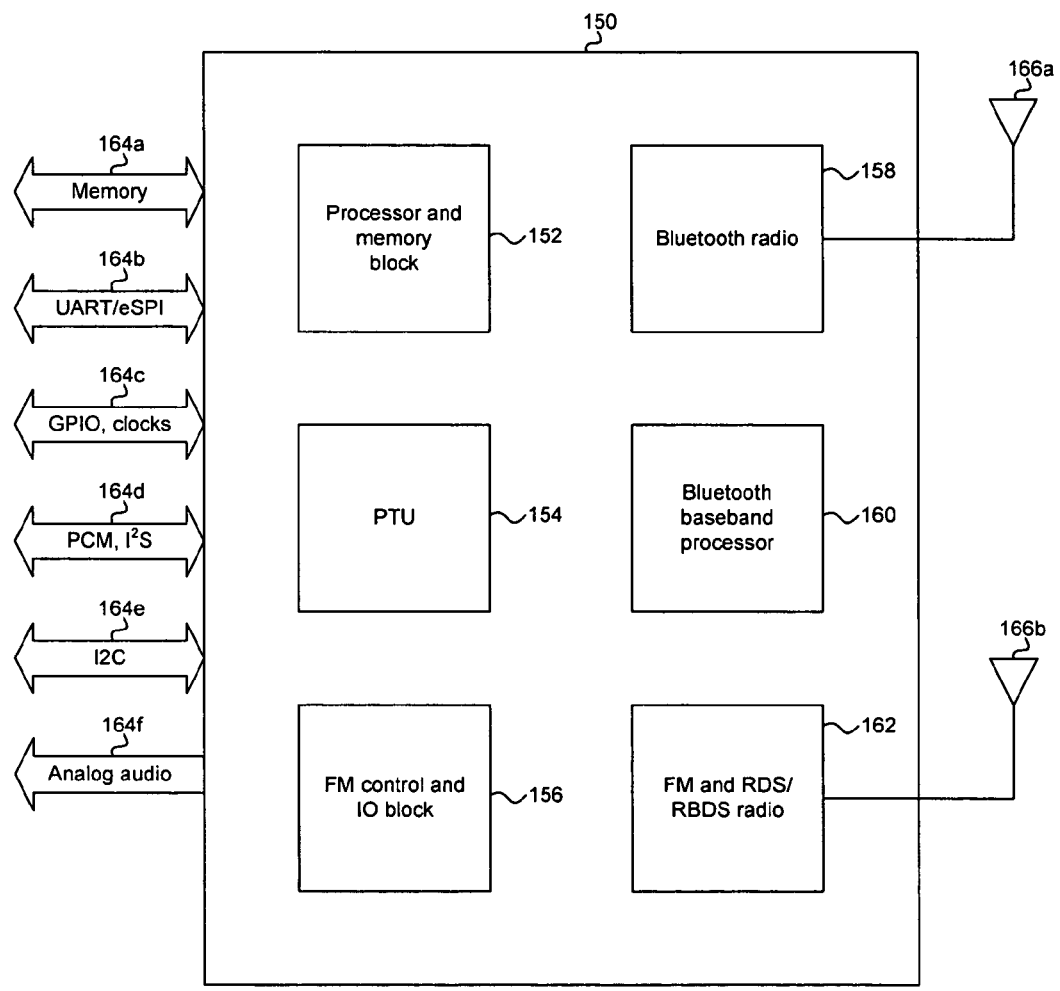
FIG. 1F is a block diagram of an exemplary single chip with integrated Bluetooth and FM radios that supports multiple interfaces, in accordance with an embodiment of the invention.

FIG. 1F is a block diagram of an exemplary single chip with integrated Bluetooth and FM radios that supports multiple interfaces, in accordance with an embodiment of the invention. Referring to FIG. 1F, there is shown a single chip 150 that supports Bluetooth and FM radio communications. The single chip 150 may comprise a processor and memory block 152, a PTU 154, an FM control and input-output (IO) block 156, a Bluetooth radio 158, a Bluetooth baseband processor 160, and an FM and radio data system (RDS) and radio broadcast data system (RDBS) radio 162. A first antenna or antenna system 166a may be communicatively coupled to the Bluetooth radio 158. A second antenna or antenna system 166b may be communicatively coupled to the FM and RDS/RBDS radio 162.

The processor and memory block 152 may comprise suitable logic, circuitry, and/or code that may enable control, management, data processing operations, and/or data storage operations, for example. The PTU 154 may comprise suitable logic, circuitry, and/or code that may enable interfacing the single chip 150 with external devices. The FM control and IO block 156 may comprise suitable logic, circuitry, and/or code that may enable control of at least a portion of the FM and RDS/RBDS radio 162. The Bluetooth radio 158 may comprise suitable logic, circuitry, and/or code that may enable Bluetooth communications via the first antenna 166a. The FM and RDS/RBDS radio 162 may comprise suitable logic, circuitry, and/or code that may enable FM, RDS, and/or RBDS data communication via the second antenna 166b. The Bluetooth baseband processor 160 may comprise suitable logic, circuitry, and/or code that may enable processing of baseband data received from the Bluetooth radio 158 or baseband data to be transmitted by the Bluetooth radio 158.

The PTU 154 may support a plurality of interfaces. For example, the PTU 154 may support an external memory interface 164a, a universal asynchronous receiver transmitter (UART) and/or enhanced serial peripheral interface (eSPI) interface 164b, a general purpose input/output (GPIO) and/or clocks interface 164c, a pulse-code modulation (PCM) and/or an inter-IC sound ($I^2S$) interface 164d, an inter-integrated circuit ($I^2C$) bus interface 164e, and/or an audio interface 164f.

Figure 1G:
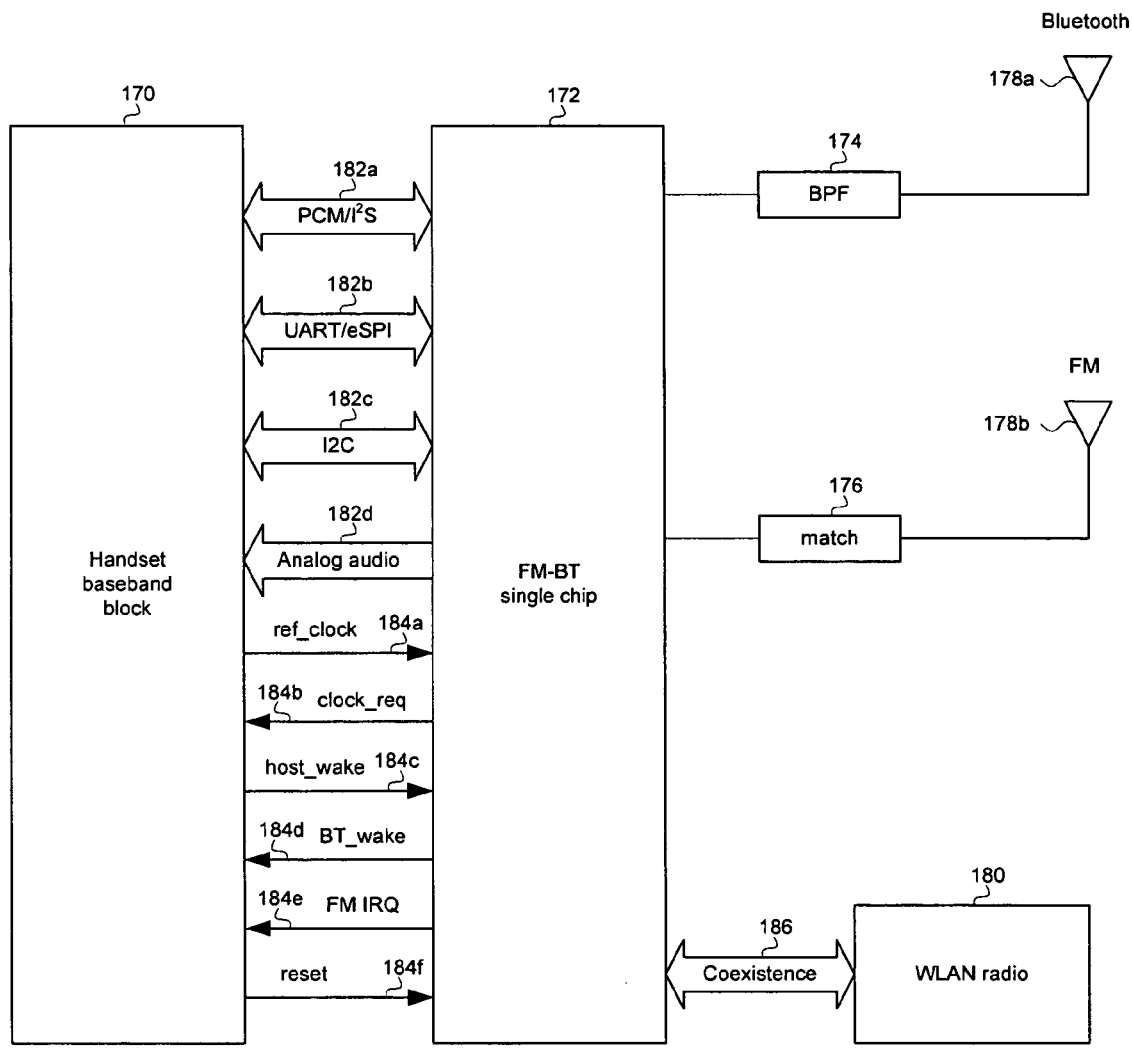
FIG. 1G is a block diagram of an exemplary single chip with integrated Bluetooth and FM radios that supports interfacing with a handset baseband device and a coexistent wireless LAN (WLAN) radio, in accordance with an embodiment of the invention.

FIG. 1G is a block diagram of an exemplary single chip with integrated Bluetooth and FM radios that supports interfacing with a handset baseband device and a coexistent wireless LAN (WLAN) radio, in accordance with an embodiment of the invention. Referring to FIG. 1G, there is shown a single chip 172, a handset baseband block 170, a band pass filter 174, a first antenna or antenna system 178a, a matching circuit 176, a second antenna or antenna filter 178b, and a WLAN radio 180. The single chip 172 may be substantially similar to the single chip 150. In this instance, the single chip 172 may comprise suitable logic, circuitry, and/or code that may enable coexistent operation with the WLAN radio 180 via the coexistence interface 186.

The single chip 172 may communicate Bluetooth data via the BPF 174 and the first antenna 178a. The single chip 172 may also communicate FM data via the matching circuit 176 and the second antenna 178b. The single chip 172 may coordinate Bluetooth data communication in the presence of WLAN channels by communicating with the WLAN radio 180 via the coexistence interface 186.

The single chip 172 may transfer data to the handset baseband block 170 via at least one interface, such as a PCM/$I^2S$ interface 182a, a UART/eSPI interface 182b, a $I^2C$ interface 182c, and/or and analog audio interface 182d. The single chip 172 and the handset baseband block 170 may also communicate via at least one control signal. For example, the handset baseband block 170 may generate a clock signal, ref_clock, 184a, a wake signal, host_wake 184c, and/or a reset signal 184f that may be transferred to the single chip 172. Similarly, the single chip 172 may generate a clock request signal, clock_req, 184b, a Bluetooth wake signal, BT_wake, 184d, and/or an FM interrupt request signal, FM IRQ, 184e that may be transferred to the handset baseband block 170. The handset baseband block 170 may comprise suitable logic, circuitry, and/or code that may enable processing of at least a portion of the data received from the single chip 172 and/or data to be transferred to the single chip 172. In this regard, the handset baseband block 170 may transfer data to the single chip 172 via at least one interface.

Figure 2A:
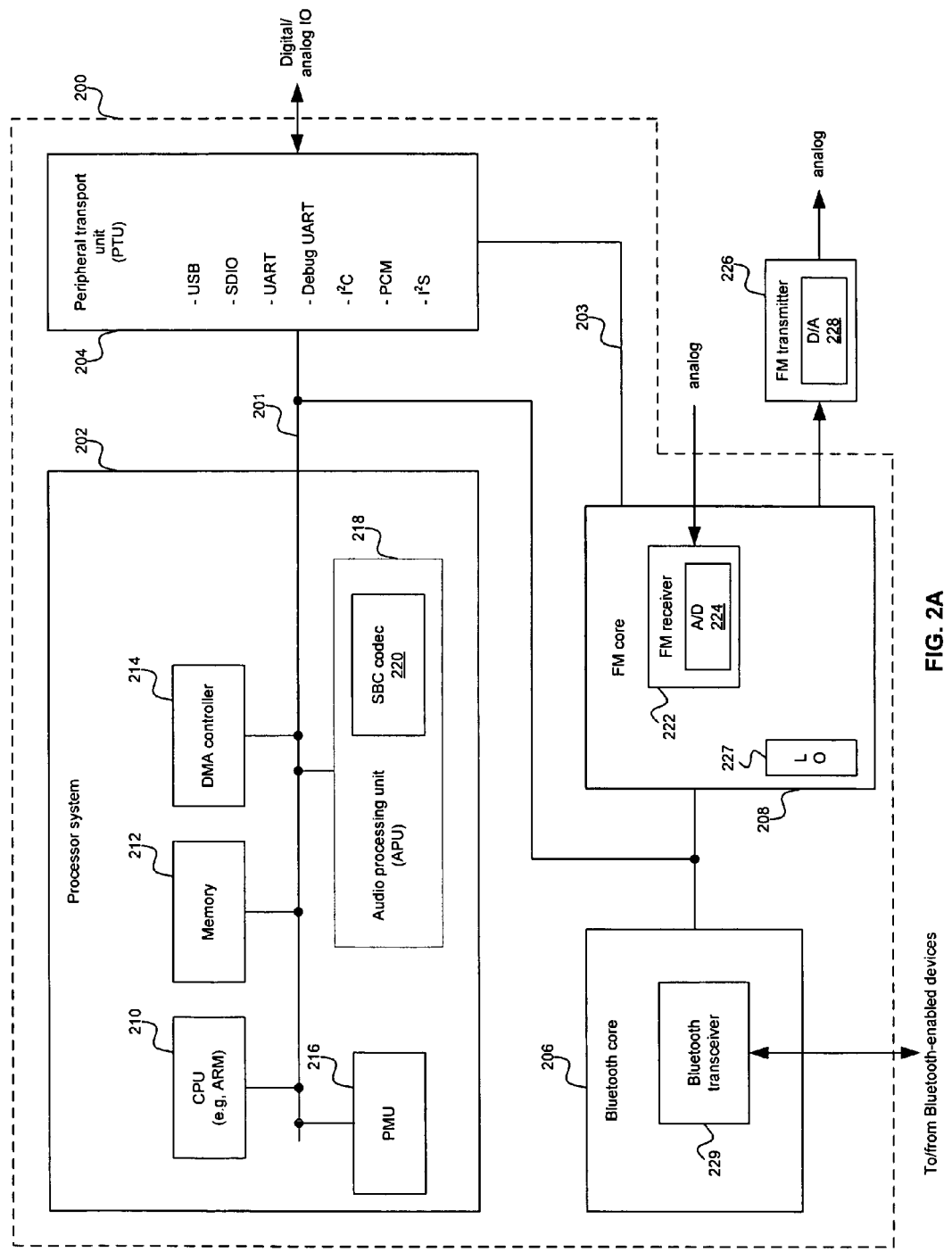
FIG. 2A is a block diagram of an exemplary single chip that supports Bluetooth and FM operations with an external FM transmitter, in accordance with an embodiment of the invention.

FIG. 2A is a block diagram of an exemplary single chip that supports Bluetooth and FM operations with an external FM transmitter, in accordance with an embodiment of the invention. Referring to FIG. 2A, there is shown a single chip 200 that may comprise a processor system 202, a peripheral transport unit (PTU) 204, a Bluetooth core 206, a frequency modulation (FM) core 208, and a common bus 201. An FM transmitter 226 may be an external device to the single chip 200 and may be communicatively coupled to the single chip 200 via the FM core 208, for example. The FM transmitter 226 may be a separate integrated circuit (IC), for example.

The processor system 202 may comprise a central processing unit (CPU) 210, a memory 212, a direct memory access (DMA) controller 214, a power management unit (PMU) 216, and an audio processing unit (APU) 218. The APU 218 may comprise a subband coding (SBC) codec 220. At least a portion of the components of the processor system 202 may be communicatively coupled via the common bus 201.

The CPU 210 may comprise suitable logic, circuitry, and/or code that may enable control and/or management operations in the single chip 200. In this regard, the CPU 210 may communicate control and/or management operations to the Bluetooth core 206, the FM core 208, and/or the PTU 204 via a set of register locations specified in a memory map. Moreover, the CPU 210 may be utilized to process data received by the single chip 200 and/or to process data to be transmitted by the single chip 200. The CPU 210 may enable processing of data received via the Bluetooth core 206, via the FM core 208, and/or via the PTU 204. For example, the CPU 210 may enable processing of A2DP data and may then transfer the processed A2DP data to other components of the single chip 200 via the common bus 201. In this regard, the CPU may utilize the SBC codec 220 in the APU 218 to encode and/or decode A2DP data, for example. The CPU 210 may enable processing of data to be transmitted via Bluetooth core 206, via the FM core 208, and/or via the PTU 204. The CPU 210 may be, for example, an ARM processor or another embedded processor core that may be utilized in the implementation of system-on-chip (SOC) architectures.

The CPU 210 may time multiplex Bluetooth data processing operations and FM data processing operations. In this regard, the CPU 210 may perform each operation by utilizing a native clock, that is, Bluetooth data processing based on a Bluetooth clock and FM data processing based on an FM clock. The Bluetooth clock and the FM clock may be distinct and may not interact. The CPU 210 may gate the FM clock and the Bluetooth clock and may select the appropriate clock in accordance with the time multiplexing scheduling or arrangement. When the CPU 210 switches between Bluetooth operations and FM operations, at least certain states associated with the Bluetooth operations or with the FM operations may be retained until the CPU 210 switches back.

For example, in the case where the Bluetooth function is not active and is not expected to be active for some time, the CPU 210 may run on a clock derived from the FM core 208. This may eliminate the need to bring in a separate high-speed clock when one is already available in the FM core 208. In the case where the Bluetooth core 206 may be active, for example when the Bluetooth is in a power-saving mode that requires it to be active periodically, the processor may chose to use a clock derived separately from the FM core 208. The clock may be derived directly from a crystal or oscillator input to the Bluetooth core 206, or from a phase locked loop (PLL) in the Bluetooth core 206. While this clocking scheme may provide certain flexibility in the processing operations performed by the CPU 210 in the single chip 200, other clocking schemes may also be implemented.

The CPU 210 may also enable configuration of data routes to and/or from the FM core 208. For example, the CPU 210 may configure the FM core 208 so that data may be routed via an I²S interface or a PCM interface in the PTU 204 to the analog ports communicatively coupled to the PTU 204.

The CPU 210 may enable tuning, such as flexible tuning, and/or searching operations in Bluetooth and/or FM communication by controlling at least a portion of the Bluetooth core 206 and/or the FM core 208. For example, the CPU 210 may generate at least one signal that tunes the FM core 208 to a certain frequency to determine whether there is a station at that frequency. When a station is found, the CPU 210 may configure a path for the audio signal to be processed in the single chip 200. When a station is not found, the CPU 210 may generate at least one additional signal that tunes the FM core 208 to a different frequency to determine whether a station may be found at the new frequency.

Searching algorithms may enable the FM core 208 to scan up or down in frequency from a presently tuned channel and stop on the next channel with received signal strength indicator (RSSI) above a threshold. The search algorithm may be able to distinguish image channels. The choice of the IF frequency during a search is such that an image channel may have a nominal frequency error of 50 KHz, which may be used to distinguish the image channel from the "on" channel. The search algorithm may also be able to determine if a high side or a low side injection provides better receive performance, thereby allowing for a signal quality metric to be developed for this purpose. One possibility to be investigated is monitoring the high frequency RSSI relative to the total RSSI. The IF may be chosen so that with the timing accuracy that a receiver may be enabled to provide, the image channels may comprise a frequency error that is sufficiently large to differentiate the image channels from the on channel.

The CPU 210 may enable a host controller interface (HCI) in Bluetooth. In this regard, the HCI provides a command interface to the baseband controller and link manager, and access to hardware status and control registers. The HCI may provide a method of accessing the Bluetooth baseband capabilities that may be supported by the CPU 210.

The memory 212 may comprise suitable logic, circuitry, and/or code that may enable data storage. In this regard, the memory 212 may be utilized to store data that may be utilized by the processor system 202 to control and/or manage the operations of the single chip 200. The memory 212 may also be utilized to store data received by the single chip 200 via the PTU 204 and/or via the FM core 208. Similarly, the memory 212 may be utilized to store data to be transmitted by the single chip 200 via the PTU 204 and/or via the FM core 208. The DMA controller 214 may comprise suitable logic, circuitry, and/or code that may enable transfer of data directly to and from the memory 212 via the common bus 201 without involving the operations of the CPU 210.

The PTU 204 may comprise suitable logic, circuitry, and/or code that may enable communication to and from the single chip 200 via a plurality of communication interfaces. In some instances, the PTU 204 may be implemented outside the single chip 200, for example. The PTU 204 may support analog and/or digital communication with at least one port. For example, the PTU 204 may support at least one universal series bus (USB) interface that may be utilized for Bluetooth data communication, at least one secure digital input/output (SDIO) interface that may also be utilized for Bluetooth data communication, at least one universal asynchronous receiver transmitter (UART) interface that may also be utilized for Bluetooth data communication, and at least one I²C bus interface that may be utilized for FM control and/or FM and RDS/RBDS data communication. The PTU 204 may also support at least one PCM interface that may be utilized for Bluetooth data communication and/or FM data communication, for example.

The PTU 204 may also support at least one inter-IC sound (I²S) interface, for example. The I²S interface may be utilized to send high fidelity FM digital signals to the CPU 210 for processing, for example. In this regard, the I²S interface in the PTU 204 may receive data from the FM core 208 via a bus 203, for example. Moreover, the I²S interface may be utilized to transfer high fidelity audio in Bluetooth. For example, in the A2DP specification there is support for wideband speech that utilizes 16 KHz of audio. In this regard, the I²S interface may be utilized for Bluetooth high fidelity data communication and/or FM high fidelity data communication. The I²S interface may be a bidirectional interface and may be utilized to support bidirectional communication between the PTU 204 and the FM core 208 via the bus 203. The I²S interface may be utilized to send and receive FM data from external devices such as coder/decoders (CODECs) and/or other devices that may further process the I²S data for transmission, such as local transmission to speakers and/or headsets and/or remote transmission over a cellular network, for example.

The Bluetooth core 206 may comprise suitable logic, circuitry, and/or code that may enable reception and/or transmission of Bluetooth data. The Bluetooth core 206 may comprise a Bluetooth transceiver 229 that may perform reception and/or transmission of Bluetooth data. In this regard, the Bluetooth core 206 may support amplification, filtering, modulation, and/or demodulation operations, for example. The Bluetooth core 206 may enable data to be transferred from and/or to the processor system 202, the PTU 204, and/or the FM core 208 via the common bus 201, for example.

The FM core 208 may comprise suitable logic, circuitry, and/or code that may enable reception and/or transmission of FM data. The FM core 208 may comprise an FM receiver 222 and a local oscillator (LO) 227. The FM receiver 222 may comprise an analog-to-digital converter (ADC) 224. The FM receiver 222 may support amplification, filtering, and/or demodulation operations, for example. This may be described in more detail with respect to FIG. 4. The LO 227 may be utilized to generate a reference signal that may be utilized by the FM core 208 for performing analog and/or digital operations. The FM core 206 may enable data to be transferred from and/or to the processor system 202, the PTU 204, and/or the Bluetooth core 206 via the common bus 201, for example. Moreover, the FM core 208 may receive analog FM data via the FM receiver 222. The ADC 224 in the FM receiver 222 may be utilized to convert the analog FM data to digital FM data to enable processing by the FM core 208. The FM core 208 may also enable the transfer of digital FM data to the FM transmitter 226. The FM transmitter 226 may comprise a digital-to-analog (D/A) converter 228 that may be utilized to convert digital FM data to analog FM data to enable transmission by the FM transmitter 226. Data received by the FM core 208 may be routed out of the FM core 208 in digital format via the common bus 201 and/or in analog format via the bus 203 to the I²S interface in the PTU 204, for example.

The FM core 208 may enable radio transmission and/or reception at various frequencies, such as, 400 MHz, 900 MHz, 2.4 GHz and/or 5.8 GHz, for example. The FM core 208 may also support operations at the standard FM band comprising a range of about 76 MHz to 108 MHz, for example.

The FM core 208 may also enable reception of RDS data and/or RBDS data for in-vehicle radio receivers. In this regard, the FM core 208 may enable filtering, amplification, and/or demodulation of the received RDS/RBDS data. The RDS/RBDS data may comprise, for example, a traffic message channel (TMC) that provides traffic information that may be communicated and/or displayed to an in-vehicle user.

Digital circuitry within the FM core 208 may be operated based on a clock signal generated by dividing down a signal generated by the LO 227. The LO 227 may be programmable in accordance with the various channels that may be received by the FM core 208 and the divide ratio may be varied in order to maintain the digital clock signal close to a nominal value.

The RDS/RBDS data may be buffered in the memory 212 in the processor system 202. The RDS/RBDS data may be transferred from the memory 212 via the I²C interface when the CPU 210 is in a sleep or stand-by mode. For example, the FM core 208 may post RDS data into a buffer in the memory 212 until a certain level is reached and an interrupt is generated to wake up the CPU 210 to process the RDS/RBDS data. When the CPU 210 is not in a sleep mode, the RDS data may be transferred to the memory 212 via the common bus 201, for example.

Moreover, the RDS/RBDS data received via the FM core 208 may be transferred to any of the ports communicatively coupled to the PTU 204 via the HCI scheme supported by the single chip 200, for example. The RDS/RBDS data may also be transferred to the Bluetooth core 206 for communication to Bluetooth-enabled devices.

In one exemplary embodiment of the invention, the single chip 200 may receive FM audio data via the FM core 208 and may transfer the received data to the Bluetooth core 206 via the common bus 201. The Bluetooth core 206 may transfer the data to the processor system 202 to be processed. In this regard, the SBC codec 220 in the APU 218 may perform SBC coding or other A2DP compliant audio coding for transportation of the FM data over a Bluetooth A2DP link. The processor system 202 may also enable performing continuous variable slope delta (CVSD) modulation, log pulse code modulation (Log PCM), and/or other Bluetooth compliant voice coding for transportation of FM data on Bluetooth synchronous connection-oriented (SCO) or extended SCO (eSCO) links. The Bluetooth-encoded FM audio data may be transferred to the Bluetooth core 206, from which it may be communicated to another device that supports the Bluetooth protocol. The CPU 210 may be utilized to control and/or manage the various data transfers and/or data processing operations in the single chip 200 to support the transmission of FM audio data via the Bluetooth protocol.

Moreover, when Bluetooth data is received, such as A2DP, SCO, eSCO, and/or MP3, for example, the Bluetooth core 206 may transfer the received data to the processor system 202 via the common bus 201. At the processor system 202, the SBC codec 220 may decode the Bluetooth data and may transfer the decoded data to the FM core 208 via the common bus 201. The FM core 208 may transfer the data to the FM transmitter 226 for communication to an FM receiver in another device.

In another exemplary embodiment of the invention, the single chip 200 may operate in a plurality of modes. For example, the single chip 200 may operate in one of an FM-only mode, a Bluetooth-only mode, and an FM-Bluetooth mode. For the FM-only mode, the single chip 200 may operate with a lower power active state than in the Bluetooth-only mode or the FM-Bluetooth mode because FM operation in certain devices may have a limited source of power. In this regard, during the FM-only mode, at least a portion of the operation of the Bluetooth core 206 may be disabled to reduce the amount of power used by the single chip 200. Moreover, at least a portion of the processor system 202, such as the CPU 210, for example, may operate based on a divided down clock from a phase locked-loop (PLL) in the FM core 208. In this regard, the PLL in the FM core 208 may utilize the LO 227, for example.

Moreover, because the code necessary to perform certain FM operations, such as tuning and/or searching, for example, may only require the execution of a few instructions in between time intervals of, for example, 10 ms, the CPU 210 may be placed on a stand-by or sleep mode to reduce power consumption until the next set of instructions is to be executed. In this regard, each set of instructions in the FM operations code may be referred to as a fragment or atomic sequence. The fragments may be selected or partitioned in a very structured manner to optimize the power consumption of the single chip 200 during FM-only mode operation. In some instances, fragmentation may also be implemented in the FM-Bluetooth mode to enable the CPU 210 to provide more processing power to Bluetooth operations when the FM core 208 is carrying out tuning and/or searching operations, for example.

Figure 2B:
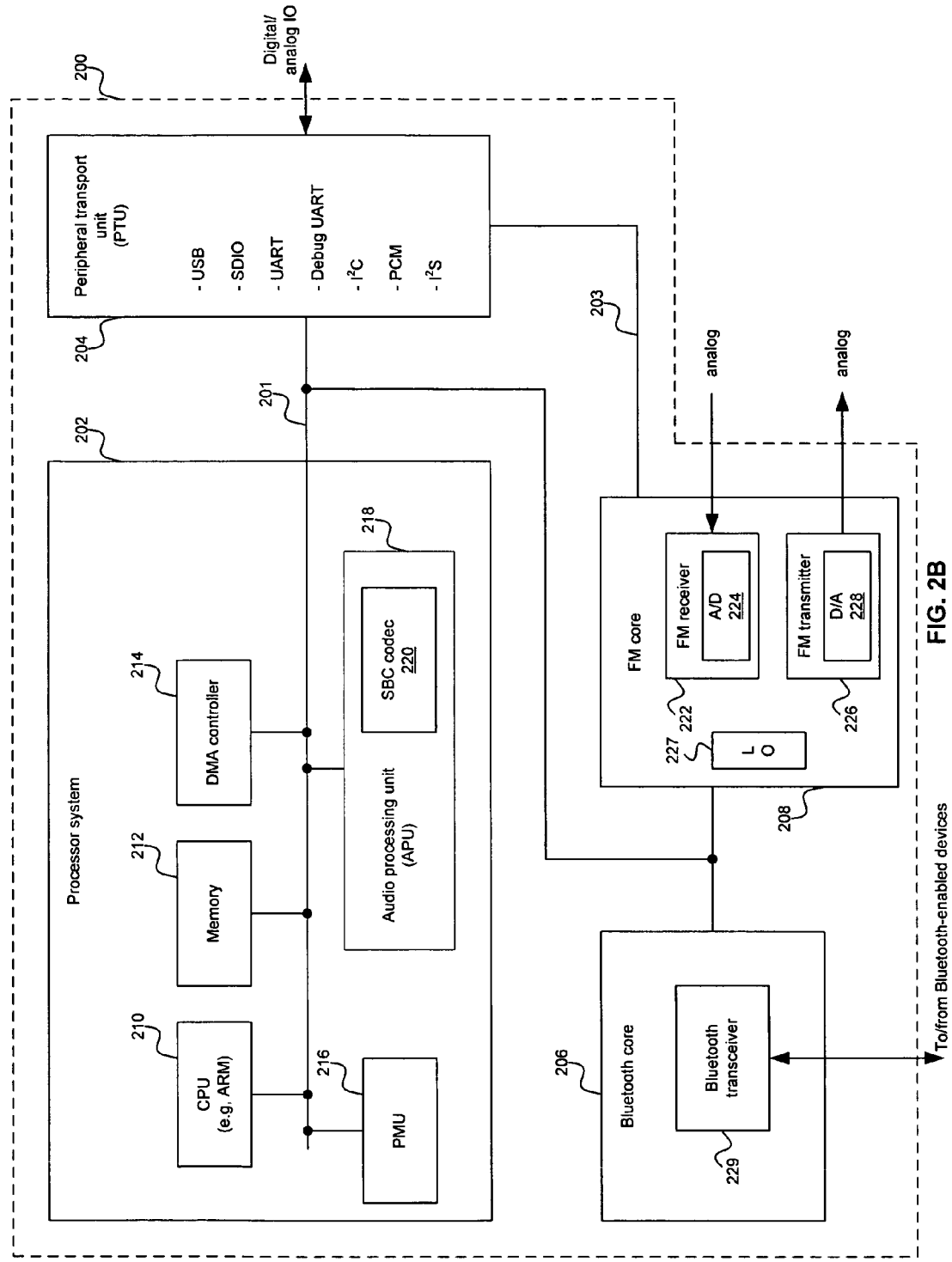
FIG. 2B is a block diagram of an exemplary single chip that supports Bluetooth and FM operations with an integrated FM transmitter, in accordance with an embodiment of the invention.

FIG. 2B is a block diagram of an exemplary single chip that supports Bluetooth and FM operations with an integrated FM transmitter, in accordance with an embodiment of the invention. Referring to FIG. 2B, there is shown the single chip 200 as described in FIG. 2A with the FM transmitter 226 integrated into the FM core 208. In this regard, the FM core 208 may support FM reception and/or transmission of FM data. The FM transmitter 226 may utilize signals generated based on the reference signal generated by the LO 227. The FM core 208 may enable transmission of data received via the PTU 204 and/or the Bluetooth core 206, for example. The exemplary implementation of the single chip 200 as described in FIG. 2B may support FM reception and/or transmission and Bluetooth reception and/or transmission.

Figure 2C:
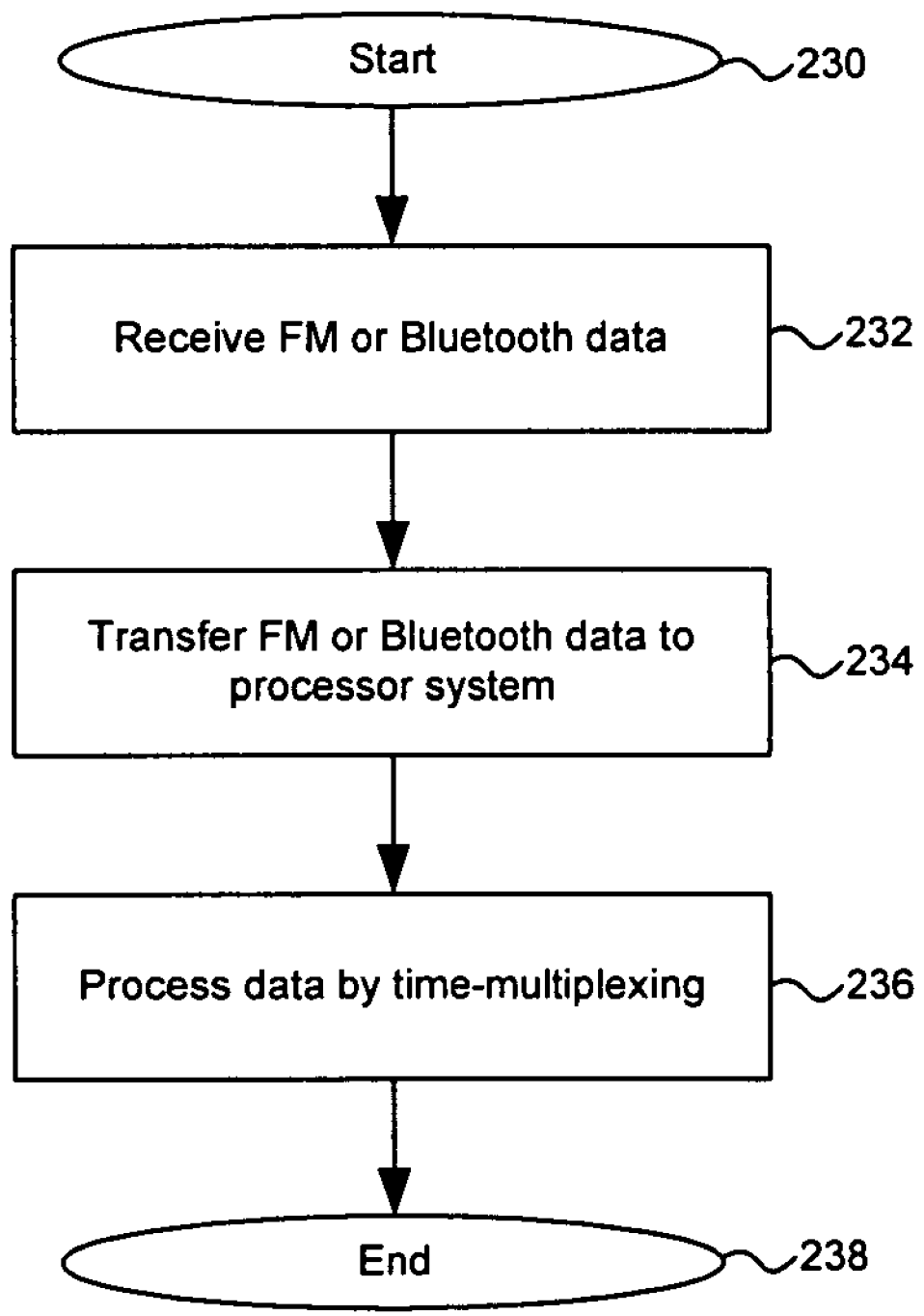
FIG. 2C is a flow diagram that illustrates exemplary steps for processing received data in a single chip with integrated Bluetooth and FM radios, in accordance with an embodiment of the invention.

FIG. 2C is a flow diagram that illustrates exemplary steps for processing received data in a single chip with integrated Bluetooth and FM radios, in accordance with an embodiment of the invention. Referring to FIGS. 2A and 2C, in step 232, after start step 230, the FM core 208 or the Bluetooth core 206 may receive data. For example, the FM core 208 may receive FM data via the FM receiver 222 and the Bluetooth core 206 may receive Bluetooth data via the Bluetooth transceiver 229. In step 234, the received data may be transferred to the processor system 202 via the common bus 201 for processing. The received data may be transferred to the memory 212 by the DMA controller 214, for example. In some instances, the processor system 202 may then transfer the data to the PTU 204, for example. The received data may be transferred to the memory 212 by the DMA controller 214, for example. In some instances, the processor system 202 may then transfer the data to the PUT 204, for example. The received data may be transferred to the processing system 202 in accordance with the time multiplexing schedule or arrangement provided by the processing system 202. In step 236, the processor system 202 may time multiplex the processing of FM data and the processing of Bluetooth data. For example, when Bluetooth data is being processed, FM data may not be transferred to the processing system 202 or may be transferred and stored in the memory 212 until FM processing is enabled. When the processing system 202 has completed processing the Bluetooth data, the FM data may be transferred to the processing system 202 for FM processing. Similarly, when FM data is being processed, Bluetooth data may not be transferred to the processing system 202 or may be transferred and stored in the memory 212 until Bluetooth processing is enabled. When the processing system 202 has completed processing the FM data, the Bluetooth data may be transferred to the processing system 202 for Bluetooth processing. After step 236, the process may proceed to end step 238.

Figure 2D:
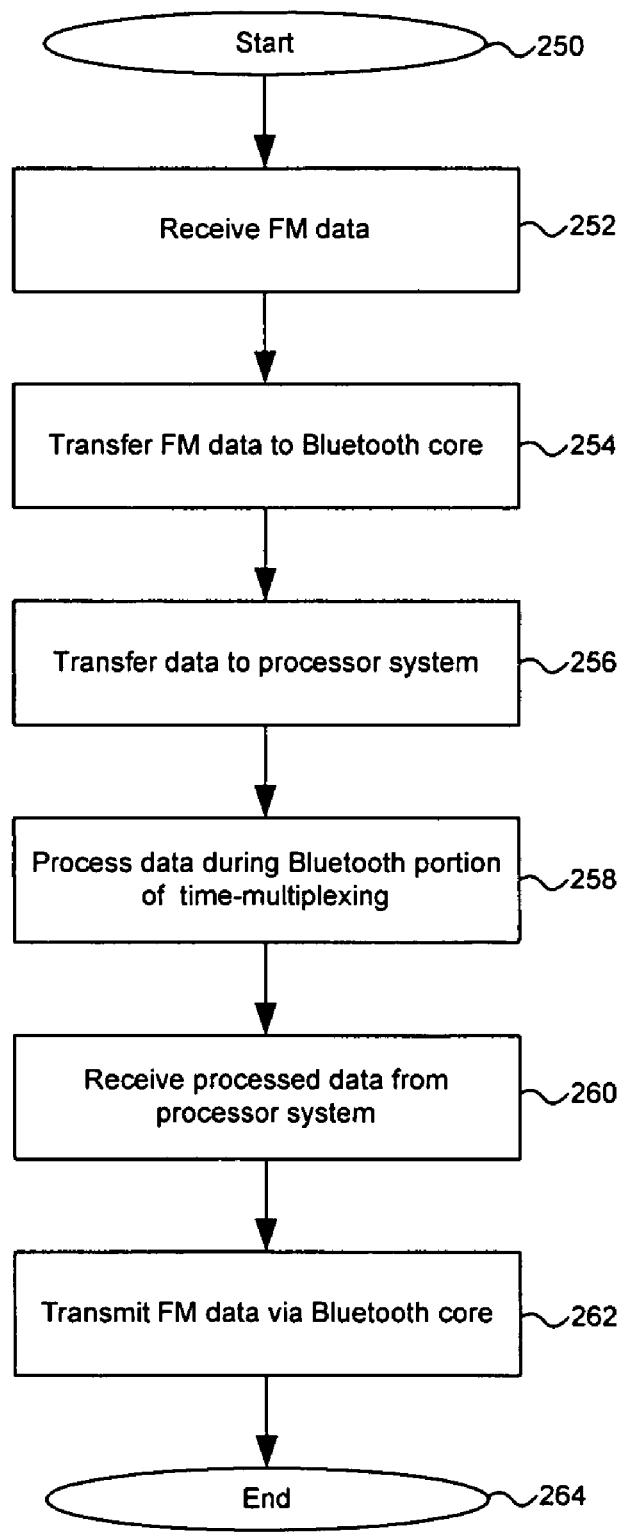
FIG. 2D is a flow diagram that illustrates exemplary steps for processing FM data via the Bluetooth core in a single chip with integrated Bluetooth and FM radios, in accordance with an embodiment of the invention.

FIG. 2D is a flow diagram that illustrates exemplary steps for processing FM data via the Bluetooth core in a single chip with integrated Bluetooth and FM radios, in accordance with an embodiment of the invention. Referring to FIGS. 2A and 2D, after start step 250, in step 252, the FM core 208 may receive FM data via the FM receiver 222. In step 254, the FM core 208 may transfer the FM data to the Bluetooth core 206 via the common bus 201. In step 256, the Bluetooth core 206 may transfer the FM data received from the FM core 208 to the processor system 202 via the common bus 201. In step 258, the processor system 202 may perform Bluetooth processing operations, such as encoding for example, to the FM data received from the Bluetooth core 206. In step 260, the Bluetooth core 206 may receive the processed FM data. In step 262, the Bluetooth core 206 may transfer the processed FM data to at least one Bluetooth-enabled device via the Bluetooth transceiver 229.

An illustrative instance where the exemplary steps described in FIG. 2D may occur is when a handset is enabled to receive FM data and the handset may be enabled to operate with a Bluetooth headset. In this regard, the handset may receive the FM audio signal via the FM core 208 and may process the received signal for transfer to the headset via the Bluetooth core 206.

Figure 2E:
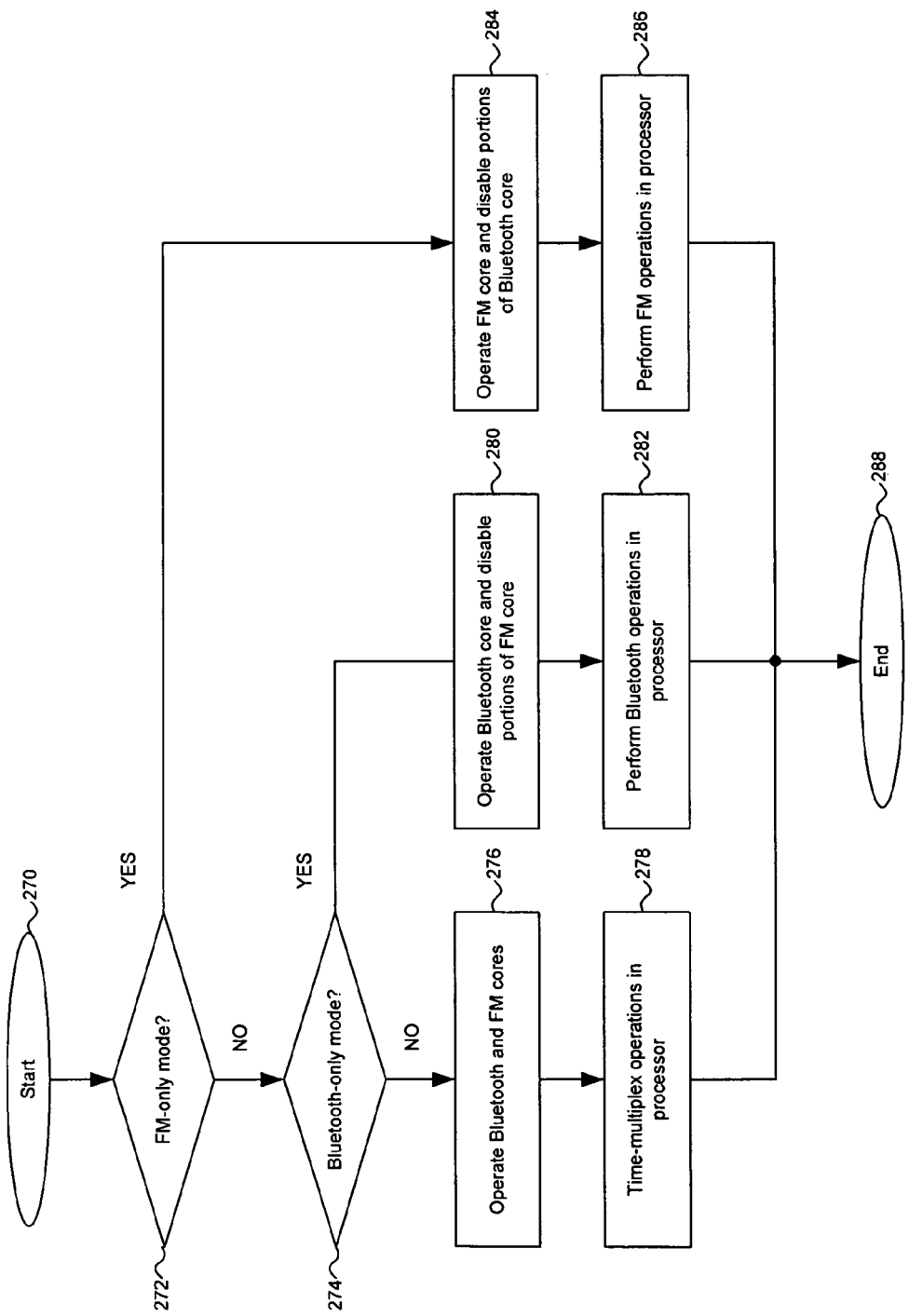
FIG. 2E is a flow diagram that illustrates exemplary steps for configuring a single chip with integrated Bluetooth and FM radios based on the mode of operation, in accordance with an embodiment of the invention.

FIG. 2E is a flow diagram that illustrates exemplary steps for configuring a single chip with integrated Bluetooth and FM radios based on the mode of operation, in accordance with an embodiment of the invention. Referring to FIG. 2E, after start step 270, in step 272, when a single chip with integrated Bluetooth and FM radios operates in an FM-only mode, the process may proceed to step 284. In step 284, the FM core 208 may be configured for operation and at least portions of the Bluetooth core 206 may be disabled. In step 286, FM data received and/or FM data to be transmitted may be processed in the processor system 202 without need for time multiplexing.

Returning to step 272, when the single chip is not operating in the FM-only mode, the process may proceed to step 274. In step 274, when the single chip is operating in the Bluetooth-only mode, the process may proceed to step 280. In step 280, the Bluetooth core 206 may be configured for operation and at least portions of the FM core 208 may be disabled. In step 282, Bluetooth data received and/or Bluetooth data to be transmitted may be processed in the processor system 202 without need for time multiplexing.

Returning to step 274, when the single chip is not operating in the Bluetooth-only mode, the process may proceed to step 276. In step 276, the Bluetooth core 206 and the FM core 208 may be configured for operation. In step 278, Bluetooth data and/or FM data may be processed in the processor system 202 in accordance with time multiplexing schedule or arrangement.

Figure 3:
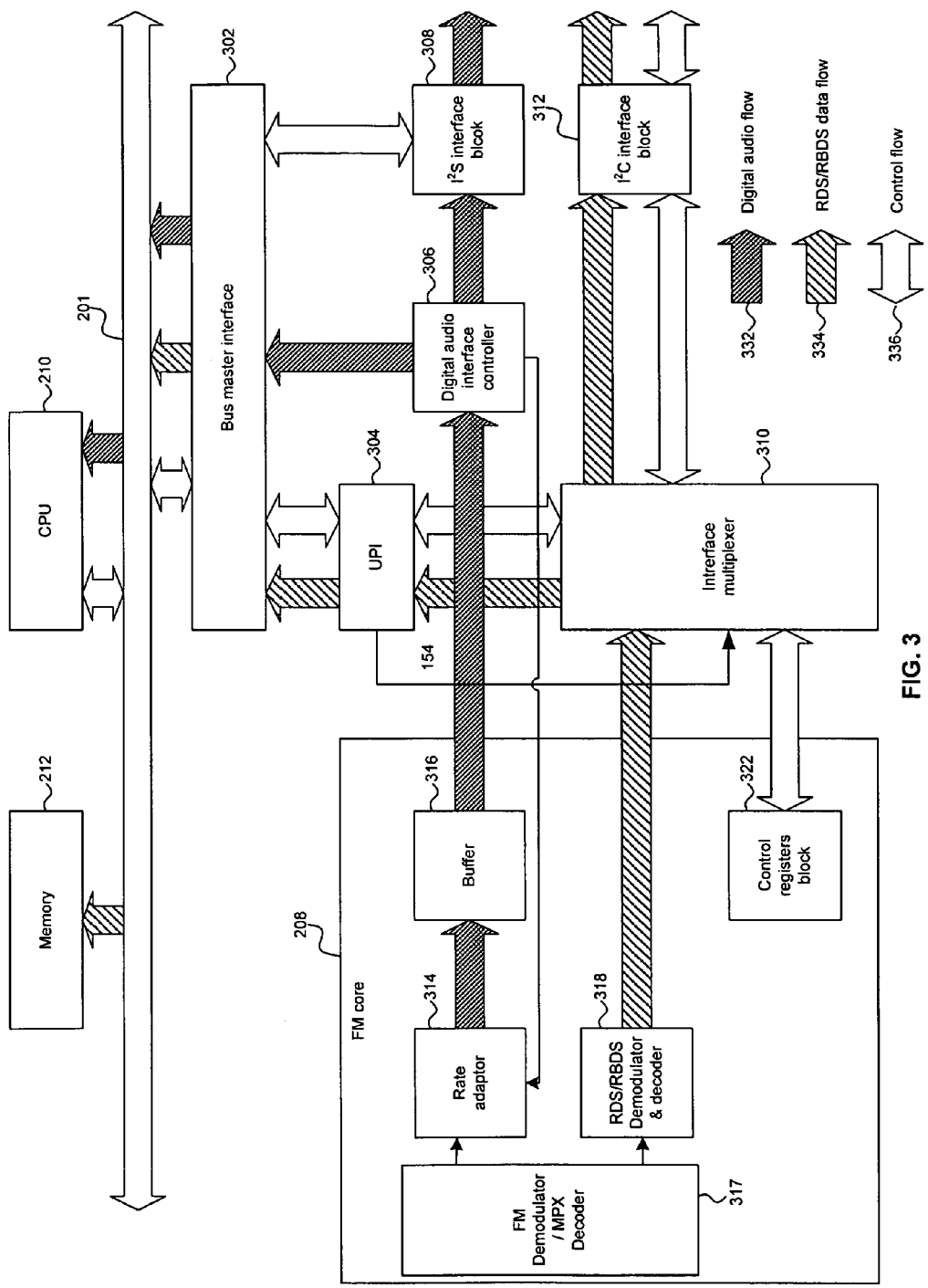
FIG. 3 is a block diagram of an exemplary FM core and PTU for processing RDS and digital audio data, in accordance with an embodiment of the invention.

FIG. 3 is a block diagram of an exemplary FM core and PTU for processing RDS and digital audio data, in accordance with an embodiment of the invention. Referring to FIG. 3, there is shown a more detailed portion of the single chip 200 described in FIGS. 2A-2B. The portion of the single chip 200 shown in FIG. 3 comprises the FM core 208, the memory 212, the CPU 210, and the common bus 201. Also shown are portions of the PTU 204 comprising an interface multiplexer 310, a universal peripheral interface (UPI) 304, a bus master interface 302, a digital audio interface controller 306, an I²S interface block 308, and an I²C interface block 312. The FM core 208 may comprise an FM/MPX demodulator and decoder 317, a rate adaptor 314, a buffer 316, an RDS/RBDS demodulator and decoder 318, and a control registers block 322. Narrowly spaced hashed arrows as illustrated by the flow arrow 332 show the flow of digital audio data. Broadly spaced hashed arrows as illustrated by the flow arrow 334 show the flow of RDS/RBDS data. Clear or blank arrows as illustrated by the dual flow arrow 336 show the flow of control data.

The FM/MPX demodulator and decoder 317 may comprise suitable logic, circuitry, and/or code that may enable processing of FM and/or FM MPX stereo audio, for example. The FM/MPX demodulator and decoder 317 may demodulate and/or decode audio signals that may be transferred to the rate adaptor 314. The FM/MPX demodulator and decoder 317 may demodulate and/or decode signals that may be transferred to the RDS/RBDS demodulator and decoder 318. The rate adaptor 314 may comprise suitable logic, circuitry, and/or code that may enable controlling the rate of the FM data received from the FM/MPX demodulator and decoder 317. The rate adaptor 314 may adapt the output sampling rate of the audio paths to the sampling clock of the host device or the rate of a remote device when a digital audio interface is used to transport the FM data. An initial rough estimate of the adaptation fractional change may be made and the estimate may then refined by monitoring the ratio of reading and writing rates and/or by monitoring the level of the audio samples in the output buffer. The rate may be adjusted in a feedback manner such that the level of the output buffer is maintained. The rate adaptor 314 may receive a strobe or pull signal from the digital audio interface controller 306, for example. Audio FM data from the rate adaptor 314 may be transferred to the buffer 316.

The buffer 316 may comprise suitable logic, circuitry, and/or code that may enable storage of digital audio data. The buffer 316 may receive a strobe or pull signal from the digital audio interface controller 306, for example. The buffer 316 may transfer digital audio data to the digital audio interface controller 306. The digital audio interface controller 306 may comprise suitable logic, circuitry, and/or code that may enable the transfer of digital audio data to the bus master interface 302 and/or the I²S interface block 308. The I²S interface 308 may comprise suitable logic, circuitry, and/or code that may enable transfer of the digital audio data to at least one device communicatively coupled to the single chip. The I²S interface 308 may communicate control data with the bus master interface 302.

The RDS/RBDS demodulator and decoder 318 may comprise suitable logic, circuitry, and/or code that may enable processing of RDS/RBDS data from the FM/MPX demodulator and decoder 317. The RDS/RBDS demodulator and decoder 318 may provide further demodulation and/or decoding to data received from the FM/MPX demodulator and decoder 317. The output of the RDS/RBDS decoder 318 may be transferred to the interface multiplexer 310. The interface multiplexer 310 may comprise suitable logic, circuitry, and/or code that may enable the transfer of RDS/RBDS data to the UPI 304 and/or the I²C interface block 312. In this regard, the UPI 304 may generate a signal that indicates to the interface multiplexer 310 the interface to select. The I²C interface 312 may comprise suitable logic, circuitry, and/or code that may enable transfer of the RDS/RBDS data to at least one device communicatively coupled to the single chip. The I²C interface 312 may also communicate control data between external devices to the single chip and the interface multiplexer 310. In this regard, the interface multiplexer 310 may communicate control data between the I²C interface 312, the UPI 304, and/or the control registers block 322 in the FM core 208. The control registers block 322 may comprise suitable logic, circuitry, and/or code that may enable the storage of register information that may be utilized to control and/or configure the operation of at least portions of the FM core 208.

The UPI 304 may comprise suitable logic, circuitry, and/or code that may enable the transfer of digital audio data to the bus master interface 302 from the interface multiplexer 310. The UPI 304 may also enable the communication of control data between the bus master interface 302 and the interface multiplexer 310. The bus master interface 302 may comprise suitable logic, circuitry, and/or code that may enable communication of control data, digital audio data, and/or RDS/RBDS data between the portions of the PTU 204 shown in FIG. 3 and the common bus 201. The bus master interface 302 may transfer digital audio data and/or RDS/RBDS data to the common bus 201. The RDS/RBDS data may be transferred to the memory 212, for example. In some instances, the RDS/RBDS data may be transferred to the memory 212 when the CPU 210 is in a stand-by or sleep mode. The bus master interface 302 may push RDS/RBDS data into a buffer in the memory 212 or may pull RDS/RBDS data from a buffer in the memory 212, for example. The digital audio data may be transferred to the CPU 210 for processing, for example. The CPU 210 may generate and/or receive control data that may be communicated with the PTU 204 and/or the FM core 208 via the common bus 201.

In one embodiment of the invention, the single chip with integrated FM and Bluetooth radios may implement a search algorithm that collects and stores data during scanning of the FM band. The single chip may determine whether there is music or speech in a detected channel. Moreover, the single chip may enable searching and finding 10 of the strongest stations, for example, and may rank them.

In another embodiment of the invention, the single chip with integrated FM and Bluetooth radios may implement a search algorithm where the searches may be done based on a specific criteria such as type of station or type of music, for example. The single chip may characterize each of the stations found based on the search.

In another embodiment of the invention, the single chip with integrated FM and Bluetooth radios may enable turning OFF a voltage regulator to the FM radio when in BT-only mode or turning OFF voltage regulators to the Bluetooth radio and the FM radio when both Bluetooth and FM are not being used, for example. In another embodiment of the invention, the single chip with integrated FM and Bluetooth radios may enable extending the battery life in a handheld device by requiring that the single chip does not consume power until configured by the host. Moreover, there may not be a load on the system until the chip is powered down and/or the chip may not draw any current when powered down.

In another embodiment of the invention, the single chip with integrated FM and Bluetooth radios may enable a digital filter that may combine de-emphasis, bass, and/or treble. The digital filter may have a programmable audio bandwidth, for example. In another embodiment of the invention, the single chip with integrated FM and Bluetooth radios may enable a power amplifier dynamical bypass for Class 1 systems. In another embodiment of the invention, the single chip with integrated FM and Bluetooth radios may enable an antenna with an adjustable center frequency.

In another embodiment of the invention, the single chip with integrated FM and Bluetooth radios may enable Bluetooth coexistence with WLAN. In this regard, coexistence may be supported when radiation of energy is not greater than a certain threshold. In some cases, such threshold may be 90 dBm, for example. The coexistence may be implemented to minimize the amount of energy that flows from the Bluetooth radio to the WLAN radio, for example. In this regard, the single chip may utilize a guilty-by-association technique in order to identify WLAN interfering channels in the vicinity of a Bluetooth device. Because WLAN channels may deteriorate very rapidly in the presence of Bluetooth communication, the guilty-by-association technique may enable a fast determination or identification of which adaptive frequency hopping (AFH) channels to block in order to limit the effect of Bluetooth communication on WLAN channels. Channel measurement statistics may be collected in 'bins' of N MHz each where N=2,3,4, etc and condemn the entire bin as bad if any K of the channels in the bin was measured as bad. An example may be when K=1. Condemnation of the entire bin as bad, that is, guilty-by-association, may increase both the reliability as well as speed with WLAN channels of contiguous 20~22 MHz that may be blocked out in the AFH channel map. The use of techniques that modify the AFH channel map need not be limited to instances when a Bluetooth radio and an FM radio are integrated into a single chip. Modification of the AFH channel map may be applied to instances when Bluetooth applications are in coexistent operation with WLAN applications.

The WLAN interfering channels may be detected by utilizing channel measurement statistics such as received signal strength indicator (RSSI) energy measurements and/or packet error rate (PER) measurements. PER measurements may include missing a packet due to synchronization errors, cyclic redundancy check (CRC) errors in decoding the header, and/or CRC errors in decoding the payload, for example. These measurements may be performed during the Bluetooth frame duration (1.25 ms) on the current Bluetooth channel or on channels different from the current Bluetooth channel.

In another embodiment of the invention, the single chip with integrated FM and Bluetooth radios may enable a low noise FM phase-locked loop (PLL) that may minimize the 32 KHz clock noise and/or the large phase noise that may occur. In this regard, the FM PLL may utilize a narrow loop bandwidth, for example.

In another embodiment of the invention, the single chip with integrated FM and Bluetooth radios may disable at least a portion of the analog circuitry in the FM radio and/or the Bluetooth radio when performing digital processing. Disabling analog circuitry provides a reduction in the amount of power consumed by the single chip.

In another embodiment of the invention, the single chip with integrated FM and Bluetooth radios may be enabled to support high definition (HD) radio systems. In HD radio systems, the broadcasters may utilize digital signals to transmit existing analog AM and FM signals. In this regard, the analog AM and FM signals may be transmitted simultaneously and the use of digital channels may result in higher quality audio and a more robust signal. In first generation HD radio systems, services such as Main Program Service or Station Reference Service may be provided. Other services that may be supported for HD radio in the single chip may be requests for audio presentation of news, weather, entertainment, and/or stocks, for example. Additional services may comprise navigational products or applications, such as traffic information, for example, time-shifted listening, mobile commerce and advertisement, Internet-based broadcasts, and/or reading services for the visually impaired.

Figure 4:
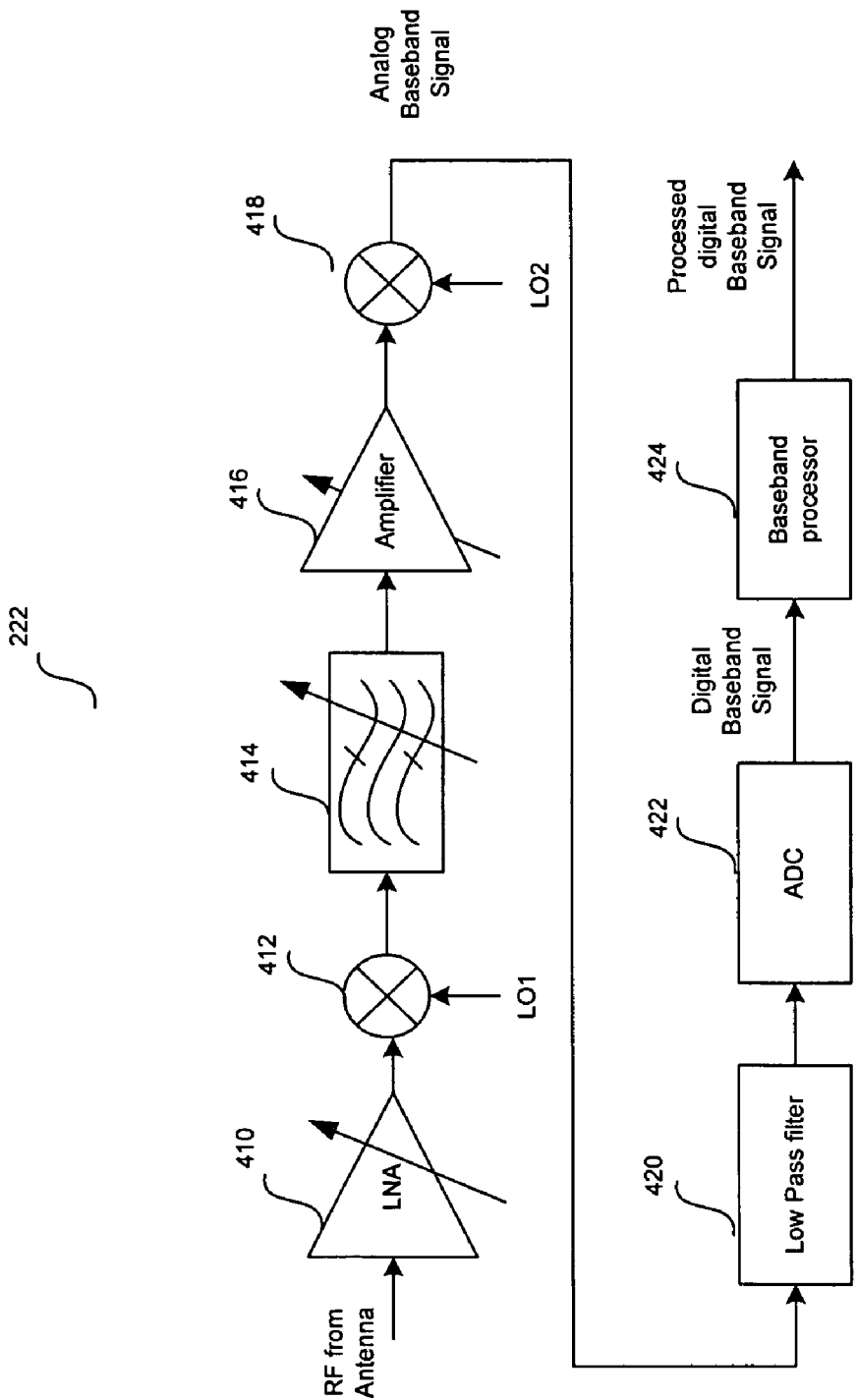
FIG. 4 is a block diagram illustrating an exemplary RF receiver front end for extracting a composite baseband signal, in accordance with an embodiment of the invention.

FIG. 4 is a block diagram illustrating an exemplary RF receiver front end for extracting a composite baseband signal, which may be utilized in connection with an embodiment of the invention. Referring to FIG. 4, there is shown the FM receiver 222 that comprises a low noise amplifier (LNA) 410, mixer 412 and 418, a bandpass filter 414, an amplifier 416, a low pass filter 420, an analog-to-digital converter (ADC) 422, and a baseband processor 424. The LNA 410 may comprise suitable logic, circuitry, and/or code that may enable amplification of input signals and output the amplified signals. The LNA 410 may be utilized in instances where the signal to noise ratio (SNR) may be relatively low, such as, for example, RF signals received by an antenna.

The mixers 412 and 418 may comprise suitable logic, circuitry, and/or code that may enable receiving two inputs signals, and generating an output signal, which may be a difference of the frequencies of the two input signals and/or a sum of the frequencies of the two input signals.

The bandpass filter 414 may comprise suitable logic, circuitry, and/or code that may enable selectively passing signals within a certain bandwidth while attenuating signals outside that bandwidth. The bandpass filter 414 may further comprise an amplifier circuit that may amplify the bandpass filtered signal. If a gain of the amplifier circuit is variable, the gain may be controlled by a processor, such as, for example, the baseband processor 424 or the CPU 210.

The amplifier 416 may comprise suitable logic, circuitry, and/or code that may enable amplification of input signals. If the gain of the amplifier 416 is variable, the gain may be controlled by a processor, such as, for example, the baseband processor 424 or the CPU 210.

The low pass filter 420 may comprise suitable logic, circuitry, and/or code that may enable selectively passing signals below a certain threshold frequency while attenuating signals above that frequency. The ADC 422 may comprise suitable logic, circuitry, and/or code that may enable sampling of an analog signal at a certain rate to generate a digital version of the analog signal. The ADC 422 may be, for example, similar to the ADC 224. The baseband processor 424 may comprise suitable logic, circuitry, and/or code that may enable processing digital baseband signals. For example, some of the processing by the baseband processor 424 may comprise demodulating to baseband a sub-carrier within the baseband signal and/or removing spur noises. These functions may be described in more detail with respect to FIGS. 5A, 5B, 5C, and 5D.

In operation, the RF signal, which may have a carrier frequency $f_{RF}$, may be received by an antenna and communicated to the LNA 410, which may amplify the RF signal. The amplified RF signal may be communicated to an input of the mixer 412. The mixer 412 may mix this amplified signal with a local oscillator signal LO1. The output of the mixer 412 may be a signal at an intermediate frequency (IF). This may allow simplified circuitry by processing an IF signal about a fixed frequency, regardless of the frequency of the RF signal received. The desired frequency of the RF signal may change, for example, by tuning to different FM radio stations. Accordingly, the frequency of the local oscillator signal LO1 may change to keep the IF signal at the same intermediate frequency.

The IF signal may be communicated to the bandpass filter 414, which may be adapted to pass the desired bandwidth of signals about the IF frequency, while attenuating or filtering out the undesired frequencies in the IF signal. The bandpass filter 414 may also amplify the desired bandwidth of signals. The gain of the bandpass filter 414 may be controlled by a processor, for example, the baseband processor 422 or the CPU 210. The amplified output signal of the bandpass filter 414 may be communicated to the amplifier 416 where further amplification may take place. The IF signal at the output of the amplifier 416 may be communicated to an input of the mixer 418.

The mixer 418 may mix the IF signal with a local oscillator signal LO2. The output of the mixer may be a second IF signal. If an FM radio station transmitted the received RF signal, the composite baseband signal used to modulate an RF carrier on the transmitter side may comprise a left channel plus a right channel baseband signal, and a left channel minus a right channel signal centered about 38 KHz. The second IF signal may be low pass filtered by the low pass filter 420. The filtered signal may be communicated to the ADC 420 where it may be converted to a digital representation of the second IF signal. The digital signal may be communicated to the baseband processor 424 for further processing, such as, for example, filtering, demodulating, and removing a spur noise at a single frequency.

FIG. 5A is a graph of received FM MPX signals, in accordance with an embodiment of the invention. Referring to FIG. 5a, there is shown a graph 510 that shows a demodulated composite baseband signal from, for example, the output of the FM/MPX demodulator and decoder 317. The composite baseband signal may comprise the left channel plus a right channel (L+R) signal 512, a pilot signal 513, a left channel minus the right channel (L−R) lower sideband signal 514, and a left channel minus right channel (L−R) upper sideband signal 516. The composite baseband signal, extracted by downconverting and demodulating the received FM carrier signal should preferably have good resemblance with the composite baseband signal used to frequency modulate an RF carrier on the FM transmitter side. The L−R lower and upper sideband signals 514 and 516 may be amplitude modulated with respect to a 38 KHz sub-carrier, which may be a double sideband suppressed carrier (DSB-SC).

After processing, the L+R signal may be extracted from the L+R signal 512 of the composite baseband signal, and the L−R signal may be extracted from the L−R lower sideband signal 514 and the L−R upper sideband signal 516. The left channel of the stereo broadcast may then be recovered by adding the L+R signal to the L−R signal to result in 2L signal. The right channel of the stereo broadcast may be recovered by subtracting the L−R signal from the L+R signal to result in 2R signal.

The pilot signal 513 may be used by, for example, the FM receiver 222 to detect whether transmission is in stereo. For example, if the pilot signal 513, which may be at 19 KHz, is not detected, the FM receiver 222 may only use the L+R signal 512 to generate monaural sound. Alternatively, if the pilot signal 513 is detected, the FM receiver 222 may use the L−R lower and upper sideband signals 514 and 516, and the L+R baseband signal 512, to generate a left channel and right channel stereo sounds.

The pilot signal 513, which may be at 19 KHz, may also be used to demodulate the L−R upper and lower sideband signals 514 and 516. The L−R lower and upper sideband signals 514 and 516 may modulate a sub-carrier at 38 KHz. Accordingly, the pilot signal 513 may be doubled to get a sub-carrier frequency needed to demodulate the L−R lower and upper sideband signals 514 and 516.

The spur noise 515 may be a single frequency noise that may be present in the L−R lower sideband signal 514. For example, the noise may have been picked up during transmission, or induced by signals in the circuitry in the FM receiver 222. For example, the spur noise may have a frequency of 32.768 KHz. This may be generally referred to as 32 KHz.

FIG. 5B is a graph of the baseband L−R signal with spur noise, in accordance with an embodiment of the invention. Referring to FIG. 5B, there is shown a graph 520 of a baseband L−R signal. The L−R signal may comprise the baseband signal 514 with the spur noise 515. Since the baseband signal 514 and the spur noise 515 may have been demodulated from a sub-carrier of 38 KHz, a frequency of the spur noise 515 may be the sub-carrier frequency of 38 KHz minus the spur noise of 32 KHz. Accordingly, the spur noise 515 may have a frequency of 6 KHz.

Figure 5D:
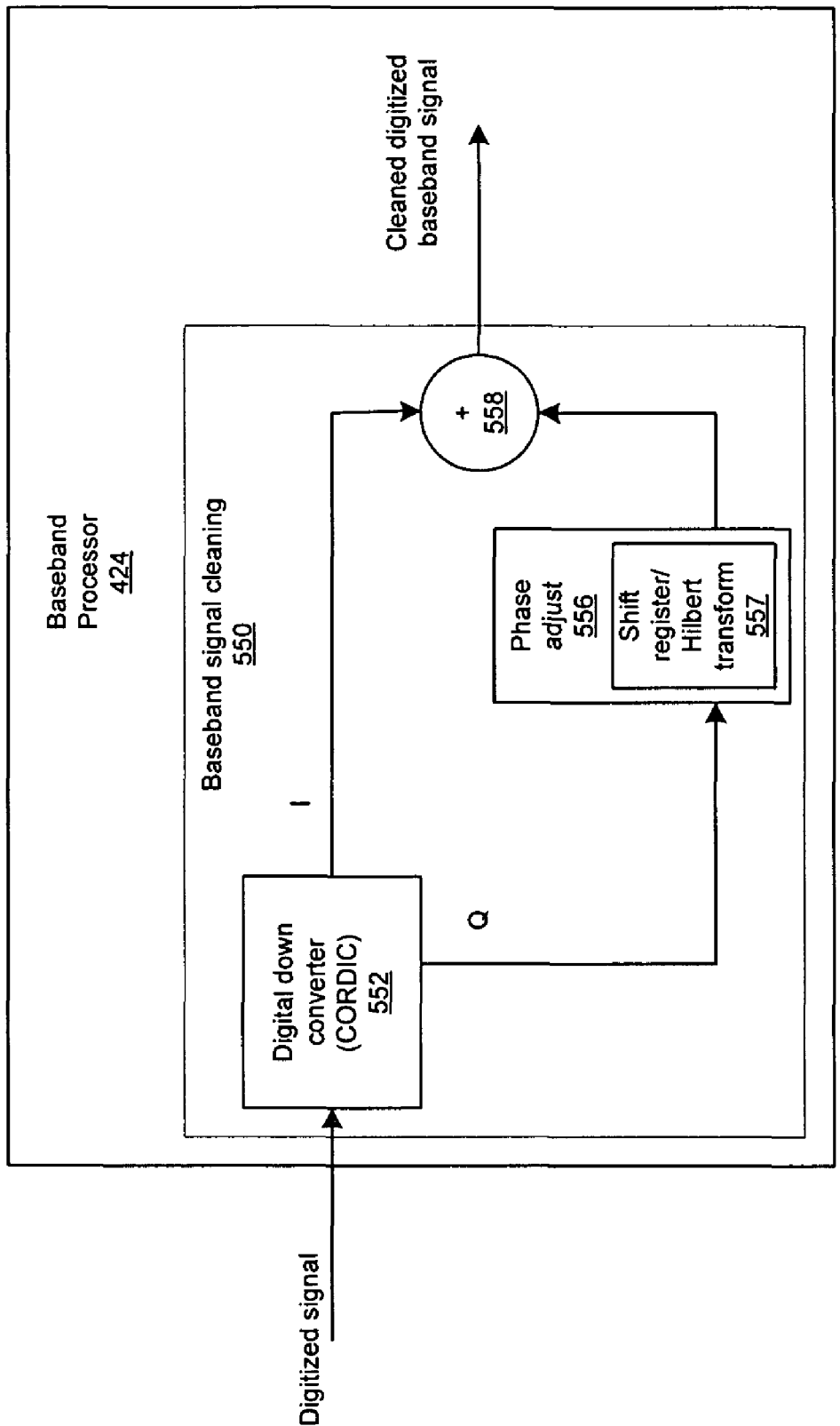
FIG. 5D is a block diagram of the circuitry that removes a spur noise, in accordance with an embodiment of the invention.

FIG. 5C is a graph of baseband L–R signal without spur noise, in accordance with an embodiment of the invention. Referring to FIG. 5C, there is shown a graph 530 of a baseband L–R signal. This signal may be a desired signal after the spur noise 515 may have been cancelled or removed. Removal of the spur noise 515 may be described in more detail with respect to FIG. 5D.

FIG. 5D is a block diagram of the circuitry that removes a spur noise, in accordance with an embodiment of the invention. Referring to FIG. 5D, there is shown a portion of the baseband processor 424 that may be the baseband signal-cleaning block 550. The baseband signal-cleaning block 550 may be used to extract the baseband L–R signal with spur noise 515 removed. In this regard, the baseband signal-cleaning block 550 may comprise a digital down converter 552, a phase adjust block 556, and a combiner block 558.

The digital down converter 552 may comprise suitable logic, circuitry, and/or code that may enable demodulation of the L–R lower and/or upper sideband signals 514 and 516 with respect to a 38 KHz sub-carrier. For example, the digital down converter 552 may comprise a coordinate rotation digital computer (CORDIC) circuit. A CORDIC circuit may use an iterative algorithm to compute trigonometric functions that may comprise information, such as, for example, phase and amplitude. By making appropriate computations, the CORDIC circuit may extract the phase and amplitude information for the baseband L–R signal. Additionally, the digital down converter 552 may generate in-phase (I) signal and out-of-phase (Q) signal. The Q signal may be –90 degrees out of phase with respect to the I signal.

The phase adjust block 556 may comprise suitable logic, circuitry, and/or code that may enable a phase shifting of –90° for a specific frequency by delaying a signal that contains that frequency by an appropriate amount. For example, delaying the output of the signal phase shift block 556 such that the 6 KHz frequency is phase shifted by –90° may result in the 6 KHz frequency being 180° out of phase with respect to the 6 KHz frequency in the signal at the input of the signal phase shift block 556. An example of a circuit that may delay a digital signal may be a shift register 557 that may be clocked by a clock signal of an appropriate frequency.

Although the phase adjust block 556 may use delay circuitry to generate an additional –90° phase shift to the 6 KHz frequency, the invention need not be so limited. For example, the shift register 557 may be replaced by another circuitry that may perform a Hilbert transform. Accordingly, a Hilbert transform block 557 may allow phase shifting of more than one frequency by –90°, thus allowing cancellation of multiple noise spurs.

The combiner block 558 may comprise suitable logic, circuitry, and/or code that may enable combining of a signal at output of the phase adjust block 556 with the signal communicated from the digital down converter 552. Accordingly, the output of the combiner block 558 may cancel the specific frequency that may have a 180° phase shift.

In operation, the digitized version of the baseband signal as described with respect to FIG. 5A may be communicated to the digital down converter 552. The digital down converter 552 may demodulate the digitized baseband signal to generate the baseband L–R signal as described with respect to FIG. 5B. The baseband L–R signal may have spur noise 515 at 6 KHz. The baseband L–R signal may be communicated to the combiner block 558 and to the phase adjust block 556.

The phase adjust block 556 may introduce a delay to the phase-shifted signal so that a phase shift of –90° may occur to the 6 KHz frequency in the phase-shifted signal. Accordingly, the output of the phase adjust block 556 may have the 6 KHz frequency out of phase by 180° with respect to the 6 KHz frequency of the signal communicated to the combiner block 558 from the digital down converter 552. The output of the phase adjust block 556 may be communicated to the combiner block 558, and the combiner block 558 may combine the two signals. The result may be a baseband L–R signal, as described with respect to FIG. 5C, without the spur noise 515.

The baseband L–R signal may be further processed by, for example, the baseband processor 424 with the baseband L+R signal to generate the left channel and right channel signals for stereo output.

Figure 5E:
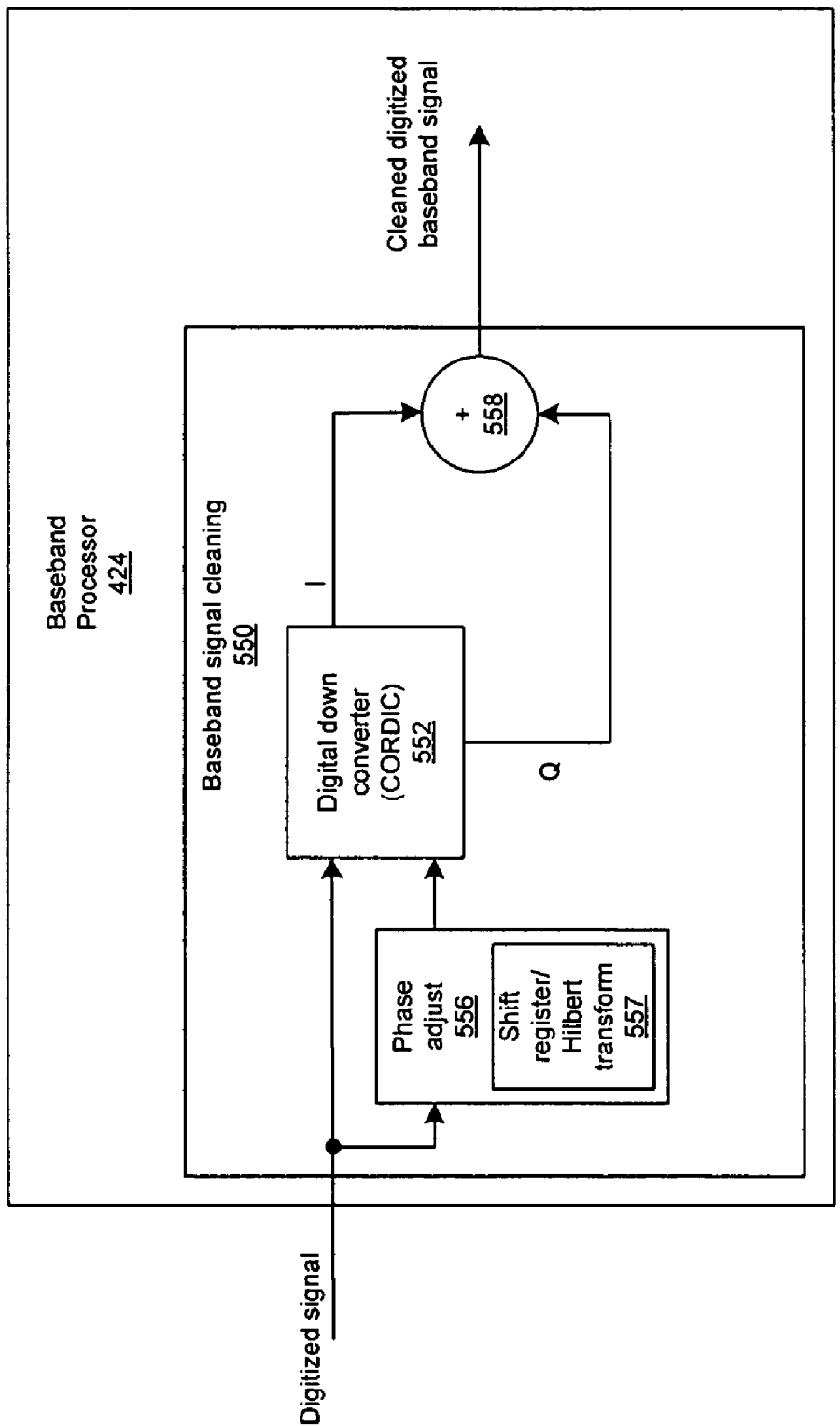
FIG. 5E is a block diagram of the circuitry that removes a spur noise, in accordance with an embodiment of the invention.

FIG. 5E is a block diagram of the circuitry that removes a spur noise, in accordance with an embodiment of the invention. Referring to FIG. 5E, there is shown a portion of the baseband processor 424 that may be the baseband signal-cleaning block 550. The baseband signal-cleaning block 550 may be used to extract the baseband L–R signal with spur noise 515 removed. In this regard, the baseband signal-cleaning block 550 may comprise the digital down converter 552, the phase adjust block 556, and the combiner block 558.

In operation, the digitized version of the baseband signal as described with respect to FIG. 5A may be communicated to the digital down converter 552 and the phase adjust block 556. The phase adjust block 556 may introduce a delay to the digital baseband signal so that a phase shift of –90° may occur to the 32 KHz frequency in the delayed digital baseband signal with respect to the 32 KHz frequency in the digital baseband signal that is not delayed. The digital down converter 552 may demodulate the undelayed digital baseband signal to generate the in-phase (I) baseband L–R signal as described with respect to FIG. 5B. The digital down converter 552 may also demodulate the delayed digital baseband signal to generate the out-of-phase (Q) baseband L–R signal as described with respect to FIG. 5B. The Q baseband L–R signal may be –90° out of phase with respect to the I baseband L–R signal. However, the 6 KHz frequency of the Q baseband L–R signal may be out of phase by 180° with respect to the 6 KHz frequency of the I baseband L–R signal. This may be because the 32 KHz frequency in the Q baseband L–R signal was already –90° out of phase with respect to the I baseband L–R signal. Downconverting and introducing a further –90° phase shift may give a total of 180° phase shift between the respective 6 KHz frequencies of the I and Q baseband L–R signals.

The I and Q baseband L–R signals may be communicated to the combiner block 558. The combiner block 558 may combine the two signals. The result may be a baseband L–R signal, as described with respect to FIG. 5C, without the spur noise 515. This baseband signal may be further processed by, for example, the baseband processor 424 with the baseband L+R signal to generate the left channel and right channel signals for stereo output.

Although the phase adjust block 556 may use delay circuitry to generate an additional –90° phase shift to the 6 KHz frequency, the invention need not be so limited. For example, the shift register 557 may be replaced by another circuitry that may perform a Hilbert transform. Accordingly, a Hilbert transform block 557 may allow phase shifting of more than one frequency by –90°, thus allowing cancellation of multiple noise spurs.

Figure 5F:
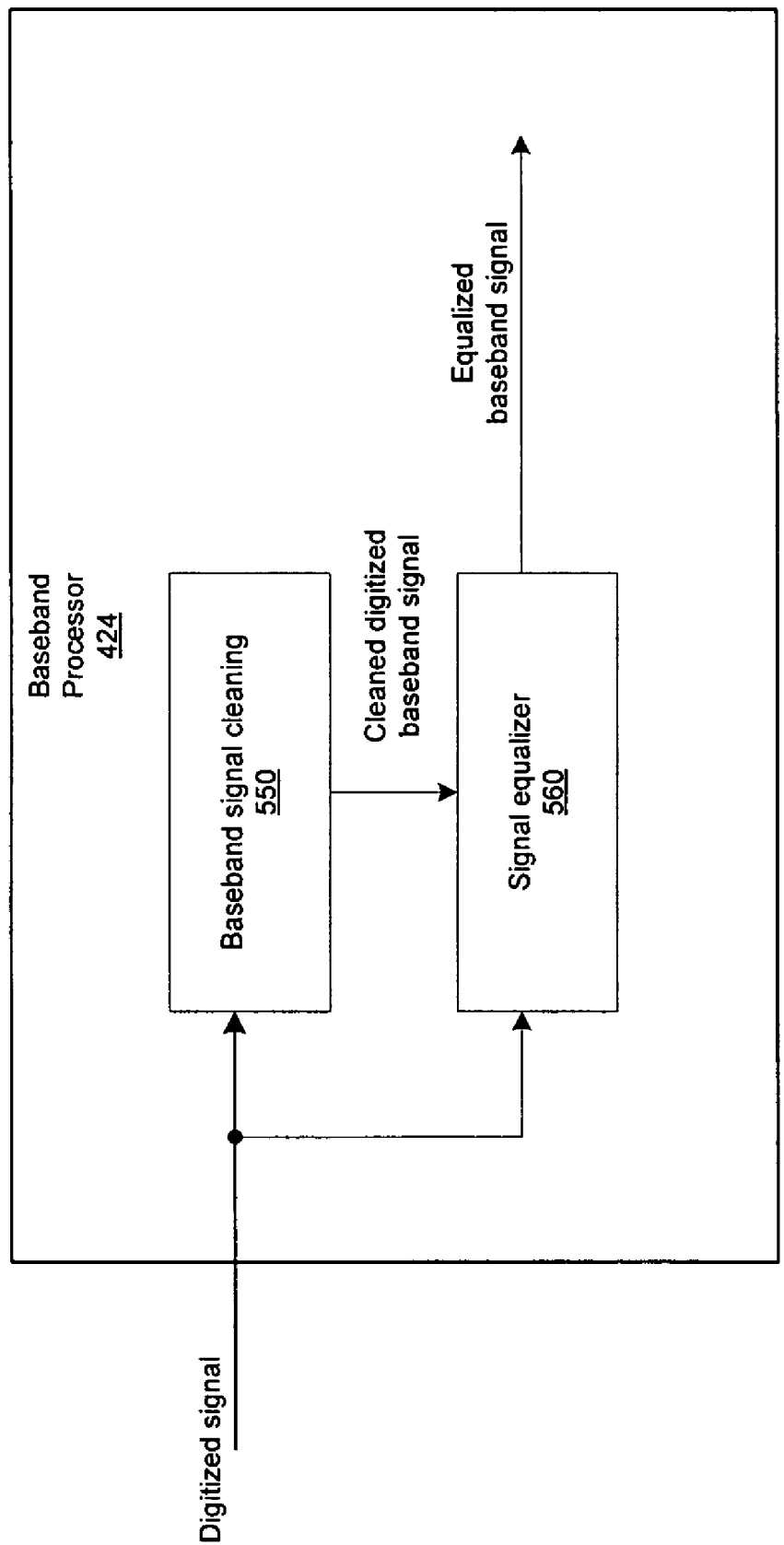
FIG. 5F is a block diagram of the circuitry that equalizes frequency response, in accordance with an embodiment of the invention.

FIG. 5F is a block diagram of the circuitry that equalizes frequency response, in accordance with an embodiment of the invention. Referring to FIG. 5F, there is shown the baseband signal cleaning block 550 and the signal equalizer block 560. The signal equalizer block 560 may comprise suitable logic, circuitry, and/or code that may enable frequency equalization of the baseband L–R signal from the baseband signal-cleaning block 550. In some cases, the removal of the spur noise 515 may affect some frequencies in the baseband L–R signal output by the baseband signal-cleaning block 550. Accordingly, the upper sideband of the L–R signal may be demodulated to a baseband signal, and the information from the baseband signal may be used to equalize the frequency response of the baseband L–R signal.

The L–R upper sideband signal 516 may have a weaker signal to noise ratio than the L–R lower sideband signal 514, however, there may not be a spur noise 515 in the L–R upper sideband signal 516. Accordingly, the frequency response of the L–R upper sideband signal 516 may not have been affected by a process of removing the spur noise 515. Although the signal from the baseband signal cleaning block 550 may be used by itself for generating the left and right channel information, the equalization using the signal equalizer block 560 may result in a signal that may be similar to the L–R signal that was used during FM transmission.

Additionally, whether the signal output by the baseband signal cleaning block 550 is frequency equalized or not, the baseband signal generated from the L–R upper sideband signal 516 may be combined with the baseband L–R signal from the baseband signal-cleaning block 550. In this manner, the signal to noise ratio of the combined signal may be greater than the signal to noise ratio of the baseband L–R signal from the baseband signal-cleaning block 550.

Although some embodiments of the invention may use hardware circuitry for processing the signals, the invention need not be so limited. For example, the signals may be processed by a digital signal processor.

Figure 6:
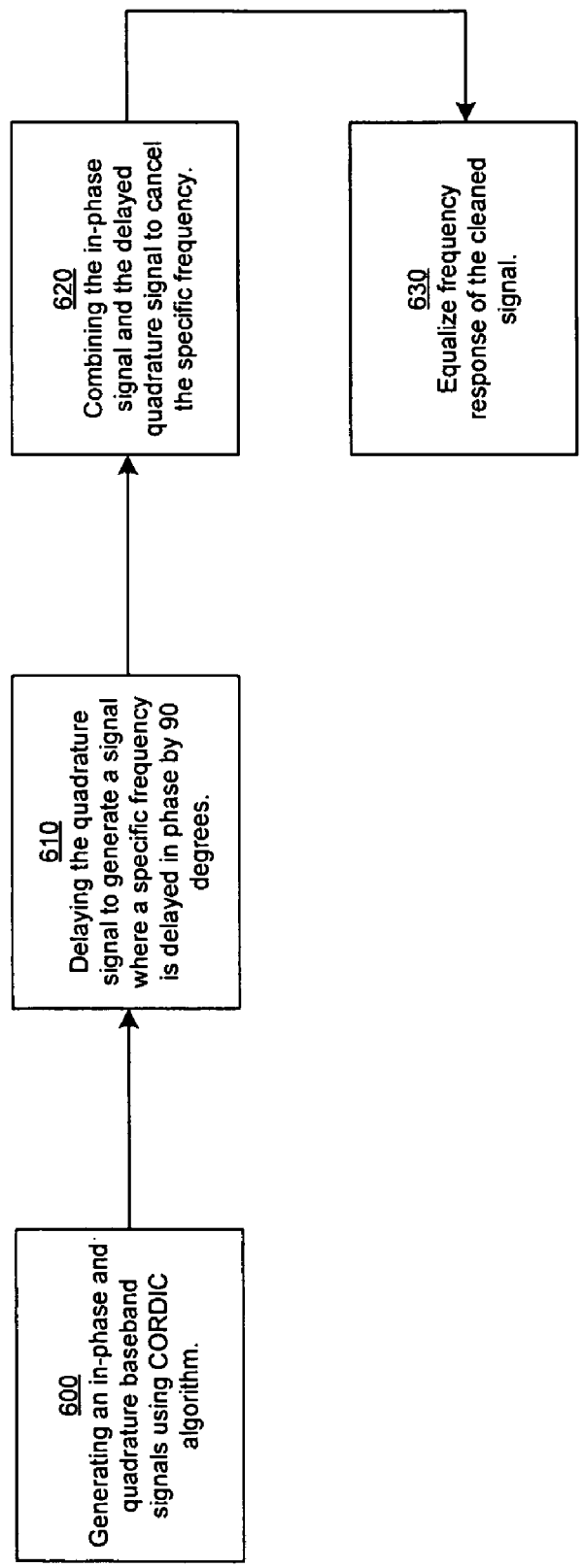
FIG. 6 is an exemplary flow diagram for digitally removing a spur noise, in accordance with an embodiment of the invention.

FIG. 6 is an exemplary flow diagram for digitally removing a spur noise, in accordance with an embodiment of the invention. In step 600, a baseband L–R signal may be demodulated by digital circuitry to generate an in-phase baseband L–R signal and a quadrature baseband L–R signal. In step 610, quadrature signal may be delayed to phase shift the 6 KHz spur noise 515 by −90° with respect to the 6 KHz component of the in-phase of the L–R signal. In step 620, the in-phase baseband L–R signal may be combined with the phase-shifted quadrature signal to cancel the 6 KHz spur noise 515 in the cleaned baseband L–R signal. In step 630, the frequency response of the cleaned baseband L–R signal may be adjusted as needed. Step 630 may be an optional step.

Referring to FIG. 6, in step 600, the digitized version of the composite baseband signal as described with respect to FIG. 5A may be communicated to the digital down converter 552 from the ADC 422. The digital down converter 552 may demodulate the digitized composite baseband signal to generate the baseband L–R signal as described with respect to FIG. 5B. The digital down converter 552 may use hardware circuitry that suitably implements CORDIC algorithm to demodulate the digitized composite baseband signal to generate an in-phase baseband L–R signal and a quadrature baseband L–R signal. The quadrature baseband L–R signal may be 90° out of phase with respect to the in-phase baseband L–R signal. The in-phase baseband L–R signal may have spur noise 515 at 6 KHz.

In step 610, the in-phase baseband L–R signal may be communicated to the combiner block 558 and to the phase adjust block 556. The phase adjust block 556 may introduce a delay to the quadrature signal so that a phase shift of −90° may occur to the 6 KHz frequency in the phase-shifted signal. Accordingly, the output of the phase adjust block 556 may have the 6 KHz frequency out of phase by 180° with respect to the 6 KHz frequency of the in-phase baseband L–R signal communicated to the combiner block 558 from the digital down converter 552.

In step 620, the output of the phase adjust block 556 may be communicated to the combiner block 558, and the combiner block 558 may combine the in-phase baseband L–R signal and the output of the phase adjust block 556. The combiner block 558 may process the two signals to generate a baseband L–R signal without the spur noise 515 as described with respect to FIG. 5C.

In step 630, the baseband L–R signal may be processed by the signal equalizer block 560. This step may be an optional step when frequency equalization may be desired. The signal equalizer block 560 may adjust the frequency response of the baseband L–R signal if the frequency response of the baseband L–R signal may have been distorted in the process of generating the baseband L–R signal. The L–R upper sideband signal 516 may be used to adjust the frequency response of the baseband L–R signal since there was no need to remove a spur noise from the L–R upper sideband signal 516. Accordingly, the frequency response of a baseband L–R signal generated from the L–R upper sideband signal 516 may not have been affected by the process of removing the spur noise 515. Although the signal from the baseband signal cleaning block 550 may be used by itself for generating the left and right channel information, the equalization using the signal equalizer block 560 may result in a signal that may be more like the L–R signal that was used during FM transmission.

Figure 7A:
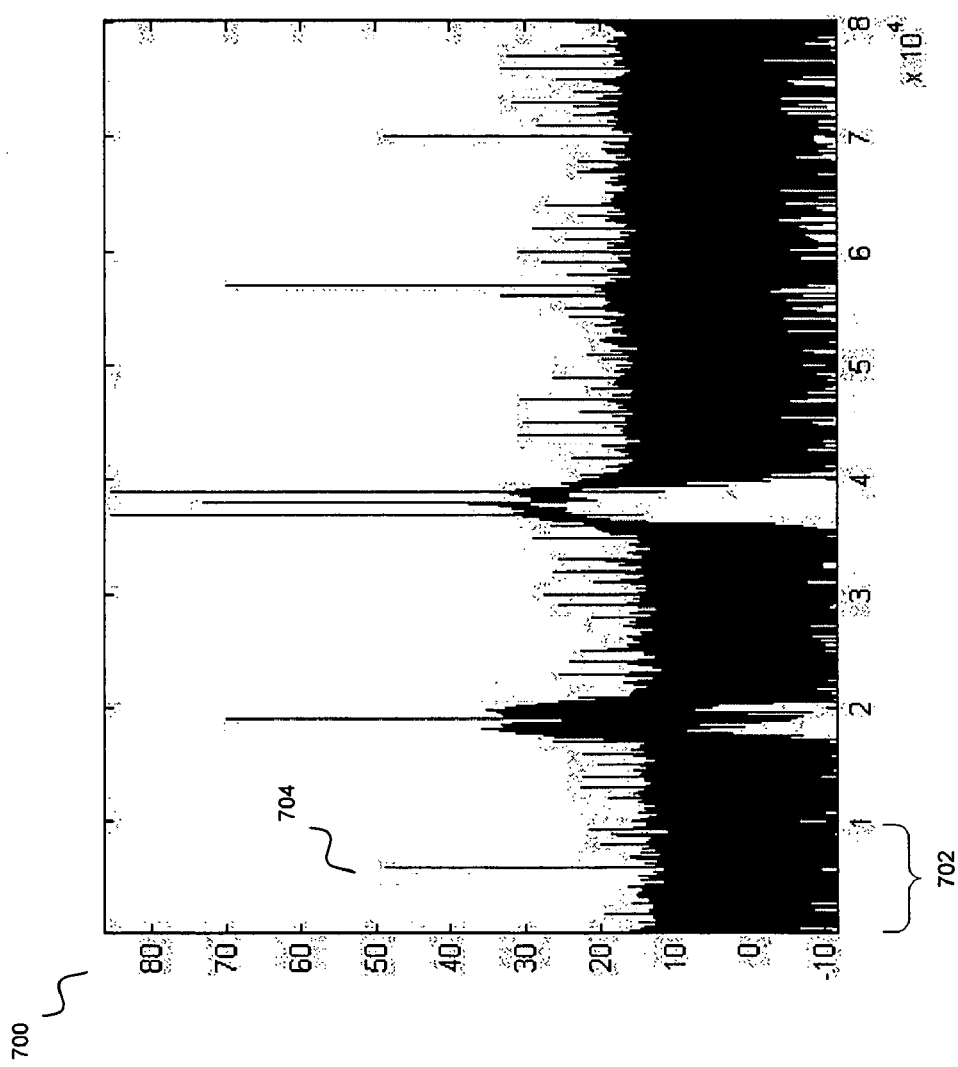
FIG. 7A is an exemplary graph illustrating received FM signals from 0 to 80 KHz before removing a spur noise, in accordance with an embodiment of the invention.

FIG. 7A is an exemplary graph illustrating received FM signals from 0 to 80 KHz before removing a spur noise, in accordance with an embodiment of the invention. Referring to FIG. 7A, there is shown a graph 700 with frequency in Hz along the horizontal axis and signal strength in dB along the vertical axis. The graph shows signal strengths for the frequency range of 0 Hz to 80 KHz, with a frequency range 702 denoting 0 Hz to 10 KHz. There is also shown a spur noise 704 that may be equivalent to the spur noise 515.

Figure 7B:
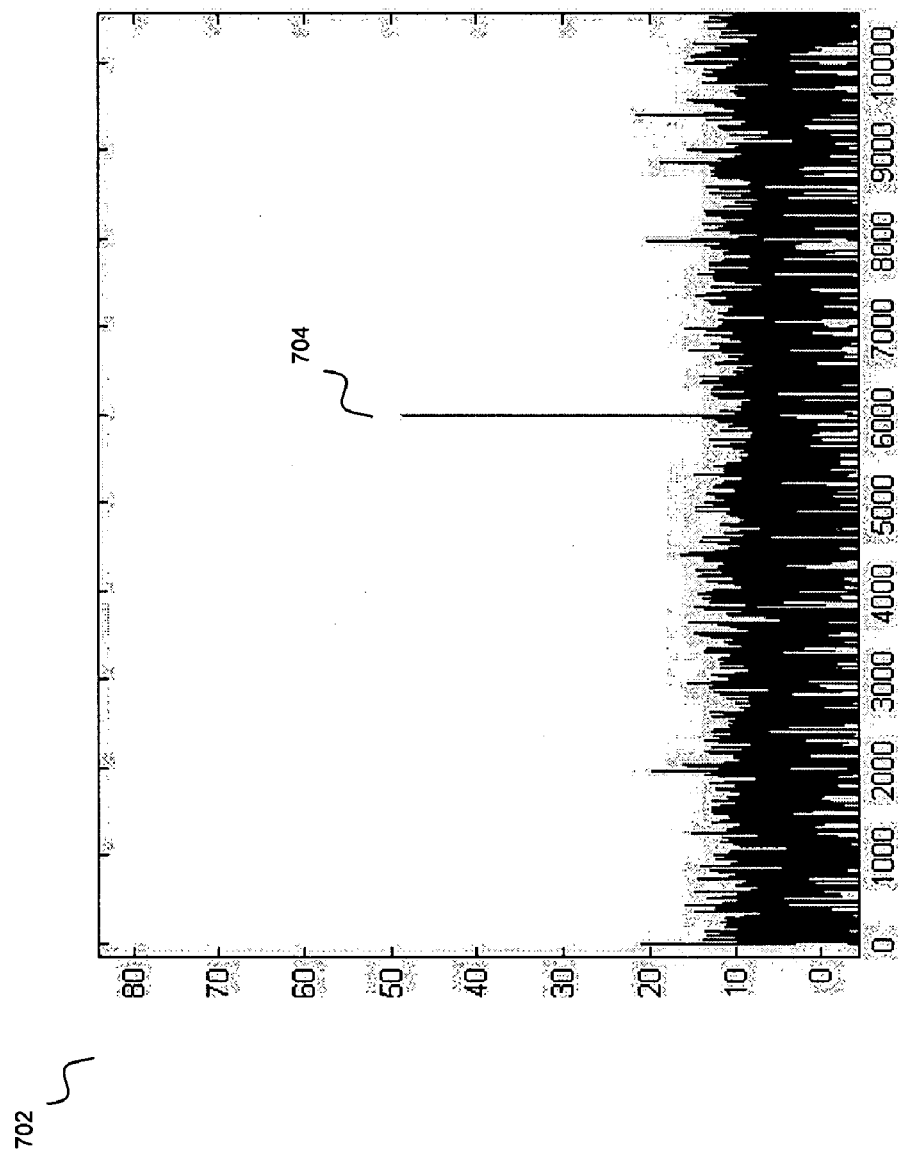
FIG. 7B is an exemplary graph illustrating received FM signals from 0 to 10 KHz before removing a spur noise, in accordance with an embodiment of the invention.

FIG. 7B is an exemplary graph illustrating received FM signals from 0 to 10 KHz before removing a spur noise, in accordance with an embodiment of the invention. Referring to FIG. 7B, there is shown a graph 702 with frequency in Hz along the horizontal axis and signal strength in dB along the vertical axis. The graph shows signal strengths for the frequency range of 0 Hz to 10 KHz. There is also shown a spur noise 704 that may be equivalent to the spur noise 515.

Figure 7C:
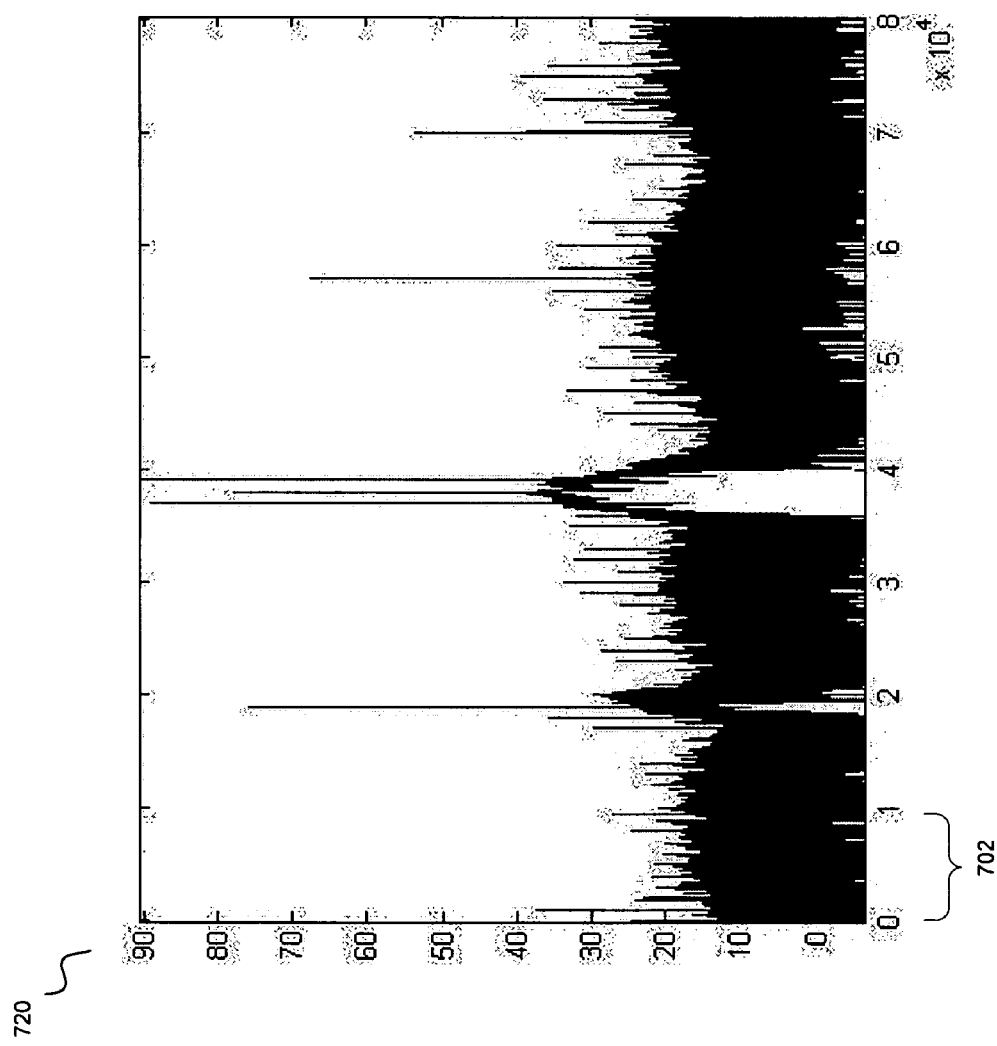
FIG. 7C is an exemplary graph illustrating received FM signals from 0 to 80 KHz after removing a spur noise, in accordance with an embodiment of the invention.

FIG. 7C is an exemplary graph illustrating received FM signals from 0 to 80 KHz after removing a spur noise, in accordance with an embodiment of the invention. Referring to FIG. 7C, there is shown a graph 720 with frequency in Hz along the horizontal axis and signal strength in dB along the vertical axis. The graph shows signal strengths for the frequency range of 0 Hz to 80 KHz, with a frequency range 702 denoting 0 Hz to 10 KHz. It may be noted that the spur noise 704 seen in FIGS. 7A and 7B may have been cancelled by an embodiment of the invention that may have been simulated via MatLab and/or C++ functions.

Figure 7D:
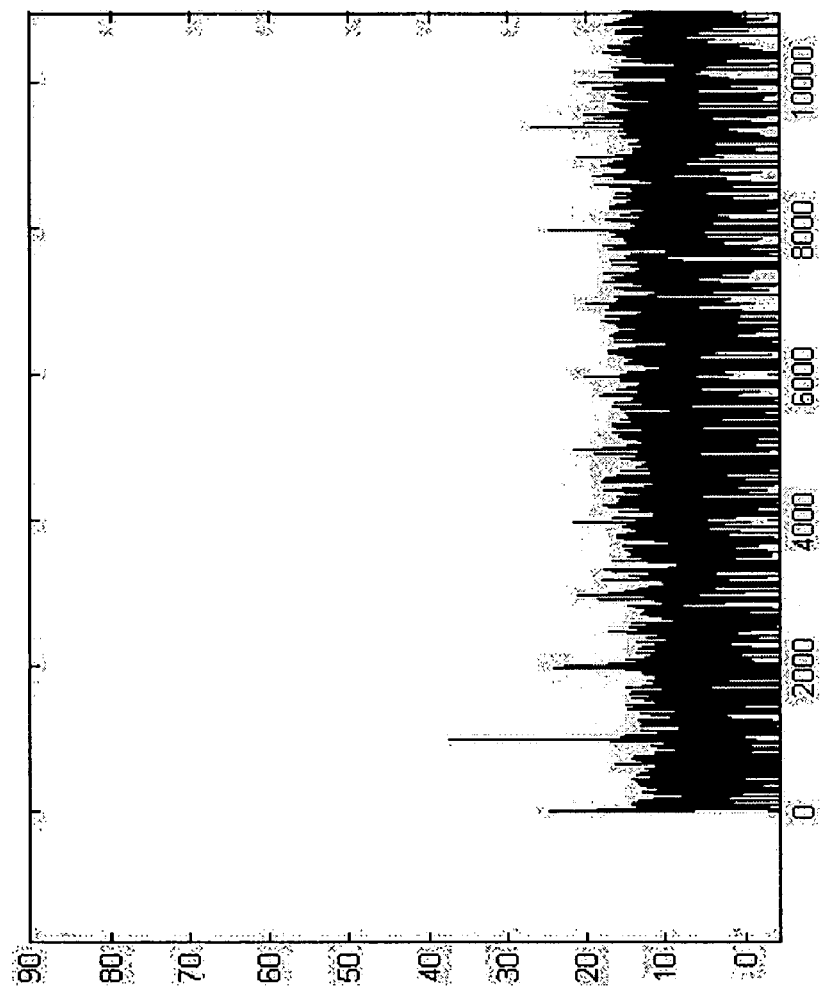
FIG. 7D is an exemplary graph illustrating received FM signals from 0 to 10 KHz after removing a spur noise, in accordance with an embodiment of the invention.

FIG. 7D is an exemplary graph illustrating received FM signals from 0 to 10 KHz after removing a spur noise, in accordance with an embodiment of the invention. Referring to FIG. 7D, there is shown a graph 702 with frequency in Hz along the horizontal axis and signal strength in dB along the vertical axis. The graph shows signal strengths for the frequency range of 0 Hz to 10 KHz. It may be noted that the spur noise 704 seen in FIGS. 7A and 7B may have been cancelled by an embodiment of the invention that may have been simulated via MatLab and/or C++ functions.

Another embodiment of the invention may provide a machine-readable storage, having stored thereon, a computer program having at least one code section executable by a machine, thereby causing the machine to perform the steps as described above for digital spur cancellation.

In accordance with an embodiment of the invention, aspects of an exemplary system may comprise a baseband signal-cleaning block 550 that enables removal of a spur 515 in a first L–R baseband signal 514 generated from a FM signal. The baseband signal-cleaning block 550 may comprise a digital down converter 552, a phase adjust block 556, and a combiner block 558. The digital down converter 552, which may also be referred to as baseband generation circuitry 552, may generate the first L–R baseband signal by demodulating a sub-carrier of a baseband signal generated from an FM signal. The baseband generation circuitry 552 may generate the first L–R baseband signal by implementing a CORDIC algorithm to demodulate the sub-carrier.

The phase adjust block 556, an embodiment of which may comprise a delay block 557, which may be referred to as a delay circuitry 557, may adjust a phase of the orthogonal signal so that the spur in the first L–R baseband signal may cancel the spur in the phase adjusted orthogonal signal when the first L–R baseband signal is combined with the phase adjusted orthogonal signal. The delay circuitry 557 may delay the orthogonal signal to phase adjust the spur by substantially −90 degrees. Accordingly, the phase-adjusted spur may be substantially 180 degrees out of phase with respect to spur in the first L–R baseband signal. The delay circuitry 557 may comprise, for example, a shift register to delay the orthogonal signal.

Other embodiments of the invention may comprise the phase adjust block 556 which comprises a Hilbert transform circuitry 557. Accordingly, the Hilbert transform block 557 may adjust a phase of the orthogonal signal so that one or more spurs in the first L–R baseband signal may cancel corresponding spurs in the phase adjusted orthogonal signal when the first L–R baseband signal is combined with the phase adjusted orthogonal signal.

The signal equalizer block 560, which may be referred to as an equalization circuitry 560, may enable equalization of frequency response of the combined baseband signal by generating a second L–R baseband signal. The second L–R baseband signal may be generated by other baseband circuitry that may be a part of, for example, the equalization circuitry 560. The other baseband circuitry may operate similarly to the baseband generation circuitry 552 in generating a baseband signal from the (L–R) upper sideband signal 516. Since the second L–R baseband signal may not have the spur, it may be used as a reference in equalizing the combined baseband signal, which may not have the spur. Although the second L–R baseband signal may not have the spur, the signal to noise ratio may not be optimal for generating the L–R baseband signal just from this portion of the FM signal. Whether or not the second L–R baseband signal is used for equalization, it may be combined with the combined baseband signal to increase the signal to noise ratio.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing wireless communication, the method comprising:
digitally removing a spur in a first baseband signal generated from a FM signal, comprising:
generating an orthogonal signal when said first baseband signal is generated; and
adjusting a phase of said generated orthogonal signal so that said spur in said first baseband signal is cancelled when said first baseband signal is digitally combined with said phase adjusted orthogonal signal.

2. The method according to claim 1, comprising generating said first baseband signal by demodulating a sub-carrier.

3. The method according to claim 1, comprising generating said first baseband signal by using a Coordinate Rotation Digital Computer (CORDIC) algorithm to demodulate a sub-carrier.

4. The method according to claim 1, comprising generating said orthogonal signal using a CORDIC algorithm to demodulate a sub-carrier.

5. The method according to claim 1, comprising delaying said orthogonal signal to said phase adjust said spur by substantially −90 degrees, whereby said phase adjusted spur is substantially 180 degrees out of phase with respect to spur in said first baseband signal.

6. The method according to claim 1, comprising using Hilbert transform to said phase adjust at least one said spur by substantially −90 degrees, whereby said phase adjusted said at least one spur is substantially 180 degrees out of phase with respect to a corresponding spur in said first baseband signal.

7. The method according to claim 1, comprising delaying said orthogonal signal by using a shift register.

8. The method according to claim 1, comprising generating a second baseband signal to combine with said combined baseband signal.

9. A machine-readable storage having stored thereon, a computer program having at least one code section for providing wireless communication, the at least one code section being executable by a machine for causing the machine to perform steps comprising:

digitally removing a spur in a first baseband signal generated from a FM signal, comprising:
generating an orthogonal signal when said first baseband signal is generated; and
adjusting a phase of said generated orthogonal signal so that said spur in said first baseband signal is cancelled when said first baseband signal is digitally combined with said phase adjusted orthogonal signal.

10. The machine-readable storage according to claim 9, wherein said at least one code section comprises code for generating said first baseband signal by demodulating a sub-carrier.

11. The machine-readable storage according to claim 9, wherein said at least one code section comprises code for generating said first baseband signal by using a Coordinate Rotation Digital Computer (CORDIC) algorithm to demodulate a sub-carrier.

12. The machine-readable storage according to claim 9, wherein said at least one code section comprises code for generating said orthogonal signal by using a CORDIC algorithm to demodulate a sub-carrier.

13. The machine-readable storage according to claim 9, wherein said at least one code section comprises code for delaying said orthogonal signal to said phase adjust said spur by substantially −90 degrees, whereby said phase adjusted spur is substantially 180 degrees out of phase with respect to spur in said first baseband signal.

14. The machine-readable storage according to claim 9, wherein said at least one code section comprises code for using Hilbert transform to said phase adjust at least one said spur by substantially −90 degrees, whereby said phase adjusted said at least one spur is substantially 180 degrees out of phase with respect to a corresponding spur in said first baseband signal.

15. The machine-readable storage according to claim 9, wherein said at least one code section comprises code for generating said orthogonal signal by using a Coordinate Rotation Digital Computer (CORDIC) algorithm to demodulate a sub-carrier.

16. The machine-readable storage according to claim 9, wherein said at least one code section comprises code for generating a second baseband signal to combine with said combined baseband signal.

17. A system for providing wireless communication, the system comprising:
circuitry that enables digital removal of a spur in a first baseband signal generated from a FM signal, comprising:
a baseband generation circuitry that enables generation of an orthogonal signal when said first baseband signal is generated; and
a delay circuitry that enables adjustment of a phase of said generated orthogonal signal so that digital combining said first baseband signal with said phase adjusted orthogonal signal may result in a combined baseband signal in which said spur is cancelled.

18. The system according to claim 17, wherein a baseband generation circuitry enables generation of said first baseband signal by demodulating a sub-carrier.

19. The system according to claim 17, wherein said baseband generation circuitry enables generation of said first baseband signal by implementing a Coordinate Rotation Digital Computer (CORDIC) algorithm to demodulate a sub-carrier.

20. The system according to claim 17, wherein said baseband generation circuitry enables generation of said orthogonal signal by implementing a CORDIC algorithm to demodulate a sub-carrier.

21. The system according to claim 17, wherein said delay circuitry delays said orthogonal signal to said phase adjust said spur by substantially −90 degrees, whereby said phase adjusted spur is substantially 180 degrees out of phase with respect to spur in said first baseband signal.

22. The system according to claim 17, comprising circuitry that enables use of Hilbert transform to said phase adjust at least one said spur by substantially −90 degrees, whereby said phase adjusted said at least one spur is substantially 180 degrees out of phase with respect to a corresponding spur in said first baseband signal.

23. The system according to claim 17, wherein said delay circuitry comprises a shift register to delay said orthogonal signal.

24. The system according to claim 17, comprising another baseband circuitry that enables generation of a second baseband signal to combine with said combined baseband signal.

* * * * *